US009170606B2

(12) United States Patent
Matsumoto et al.

(10) Patent No.: US 9,170,606 B2
(45) Date of Patent: Oct. 27, 2015

(54) INFORMATION PROCESSING DEVICE, PROCESSING CONTROL METHOD, PROGRAM, AND RECORDING MEDIUM

(75) Inventors: Takuya Matsumoto, Osaka (JP); Rinako Kamei, Osaka (JP); Norihiro Matsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 272 days.

(21) Appl. No.: 13/577,699

(22) PCT Filed: Dec. 21, 2011

(86) PCT No.: PCT/JP2011/007170
§ 371 (c)(1),
(2), (4) Date: Aug. 8, 2012

(87) PCT Pub. No.: WO2012/104951
PCT Pub. Date: Aug. 9, 2012

(65) Prior Publication Data
US 2012/0299862 A1    Nov. 29, 2012

(30) Foreign Application Priority Data
Jan. 31, 2011 (JP) .................................. 2011-018422

(51) Int. Cl.
*G06F 3/041* (2006.01)
*G06F 1/16* (2006.01)
(Continued)

(52) U.S. Cl.
CPC ............ *G06F 1/1626* (2013.01); *G06F 1/1632* (2013.01); *G06F 1/1686* (2013.01);
(Continued)

(58) Field of Classification Search
USPC ........................................................ 345/173
See application file for complete search history.

(56) References Cited

U.S. PATENT DOCUMENTS 8,446,375 B2 * 5/2013 Yasumi ......................... 345/173
2008/0036743 A1 * 2/2008 Westerman et al. .......... 345/173
(Continued)

FOREIGN PATENT DOCUMENTS

JP    2002-312121    10/2002
JP    2003-131785    5/2003
(Continued)

OTHER PUBLICATIONS

Machine translation of Japan Publication No. 201079662 on Apr. 8, 2010 by Umetsu Masakazu.*
(Continued)

*Primary Examiner* — Linh N Hoffner
(74) *Attorney, Agent, or Firm* — Wenderoth, Lind & Ponack, L.L.P.

(57) ABSTRACT

An information processing device, while in a first input mode for receiving a touchless operation as an input, receives a touchless operation as an input, and starts processing that corresponds to the received touchless operation. If the information processing device detects a switch operation, which is made with a touch on the information processing device for switching from the first input mode to a second input mode that is a mode for receiving a touch operation as an input, within a predetermined time period after the reception of the touchless operation, the information processing device sets an output status obtained as a result of the started processing to an output status which has been obtained before the start of the processing.

13 Claims, 18 Drawing Sheets

(51) Int. Cl.
  *G06F 3/0488* (2013.01)
  *G06F 3/042* (2006.01)
  *G06F 3/044* (2006.01)
  *G06F 3/033* (2013.01)
  *G06F 3/01* (2006.01)

(52) U.S. Cl.
  CPC .............. *G06F 3/044* (2013.01); *G06F 3/0416* (2013.01); *G06F 3/0425* (2013.01); *G06F 3/0488* (2013.01); *G06F 3/04883* (2013.01); *G06F 3/017* (2013.01); *G06F 3/033* (2013.01); *G06F 3/041* (2013.01); *G06F 2203/04106* (2013.01); *G06F 2203/04108* (2013.01)

(56) References Cited

U.S. PATENT DOCUMENTS

2008/0168379 A1* 7/2008 Forstall et al. ................ 715/778
2008/0174570 A1* 7/2008 Jobs et al. .................... 345/173
2009/0160802 A1 6/2009 Yasumi
2010/0300771 A1 12/2010 Miyazaki

FOREIGN PATENT DOCUMENTS

| JP | 2009-153072 | 7/2009 |
| JP | 2010-79662 | 4/2010 |
| JP | 2010-277198 | 12/2010 |

OTHER PUBLICATIONS

Machine translation of Japanese Publication No. 2003131785 by Mihara et al by May 9, 2003.*

International Search Report issued Apr. 3, 2012 in corresponding International Application No. PCT/JP2011/007170.

* cited by examiner

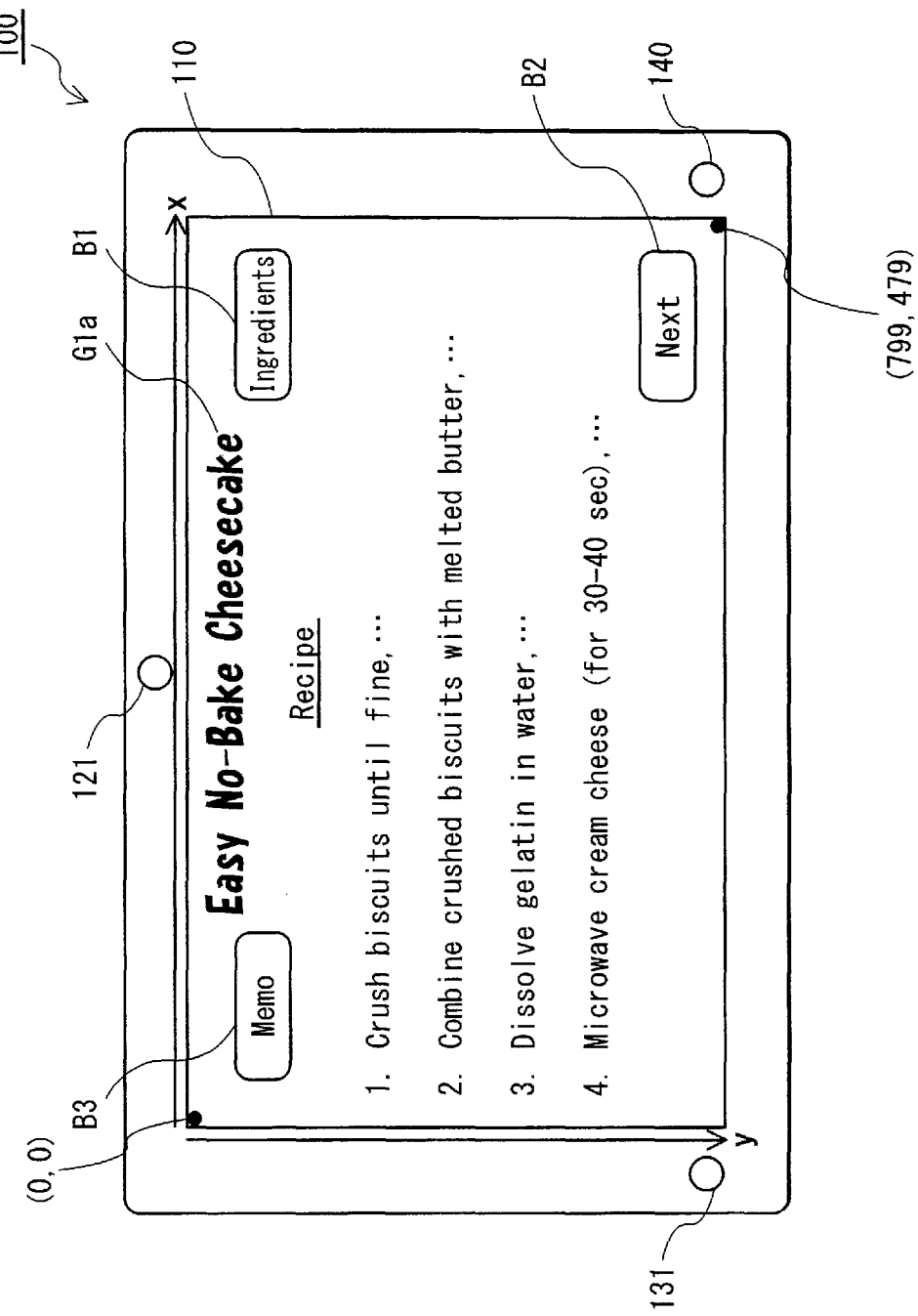

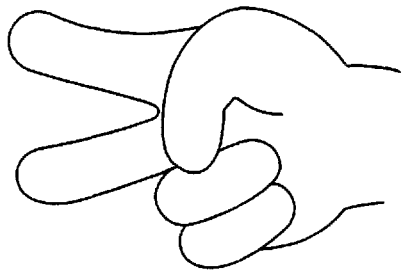
FIG. 2C  Peace sign
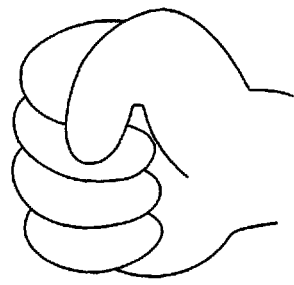
FIG. 2B  Fist sign
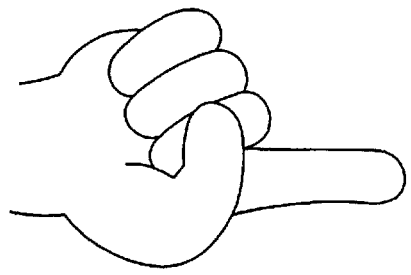
FIG. 2E  Down sign
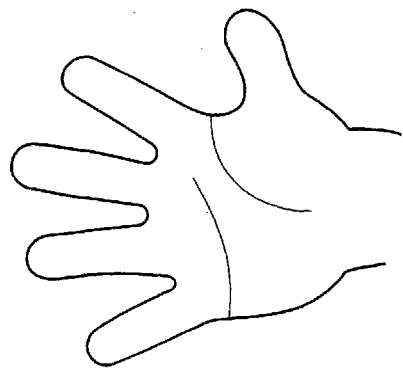
FIG. 2A  Palm sign
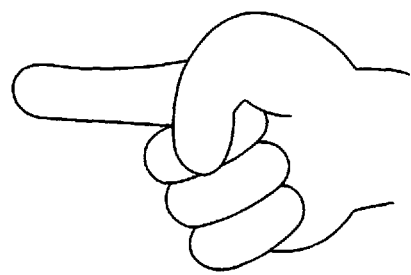
FIG. 2D  Up sign

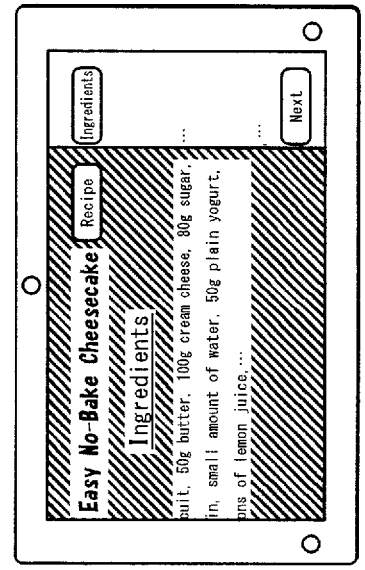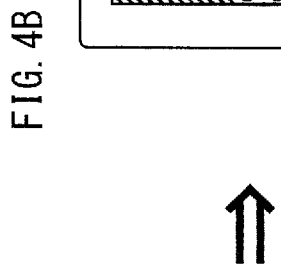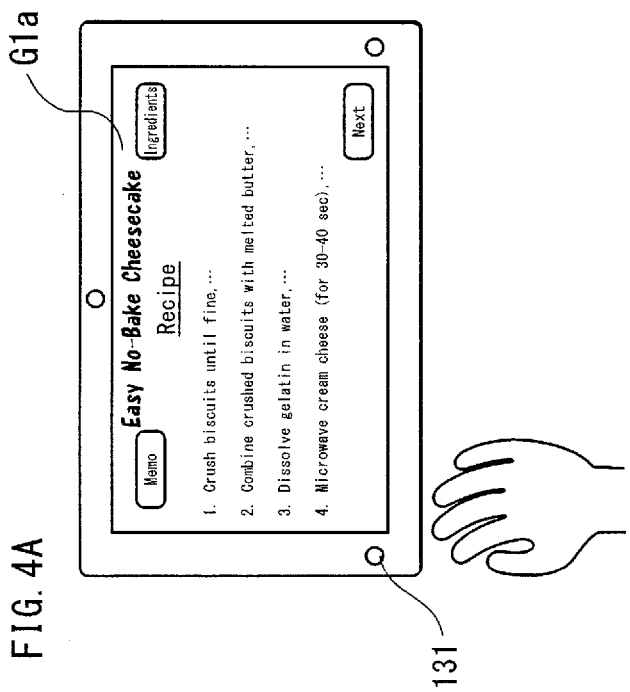
FIG. 4A
FIG. 4B
FIG. 4C

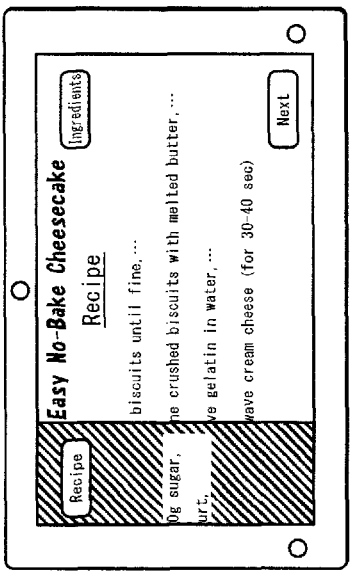
FIG. 5B
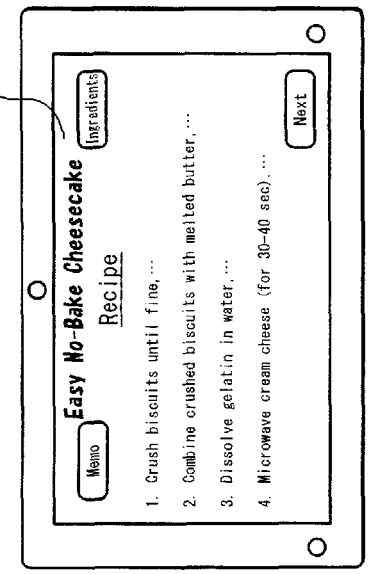
FIG. 5C
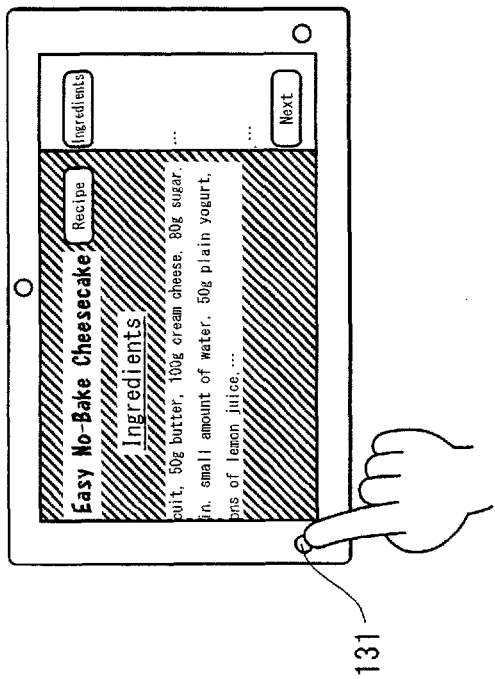
FIG. 5A

INFORMATION PROCESSING DEVICE, PROCESSING CONTROL METHOD, PROGRAM, AND RECORDING MEDIUM

TECHNICAL FIELD

The present invention relates to an information processing device, and particularly to the improvement of user interface.

BACKGROUND ART

There has been known an art for improving the user convenience by enabling a user to make an input to an operation target device via a touchless operation with no touch on the operation target device (Patent Literature 1, for example).

According to an art disclosed in the Patent Literature 1, a user (car driver) can select a desired operation menu item, by making, as a touchless operation, a predetermined sign with his hand while holding a wheel with the hand. Specifically, the user (car driver) is notified of respective names of operation menu items of an in-vehicle device (such as a car navigation system) via audio. When the user is notified of a name of a desired operation menu item, the user makes a touchless operation such as described above. Then, the device detects a sign made by the user with his hand based on images obtained by a camera, and performs processing that corresponds to the desired operation menu item.

By the way, in order to further improve the user convenience, it is desirable to enable the user to appropriately switch an input mode depending on the situation where the user operates an operation target device, between a mode for receiving, as an input, a touchless operation such as described above and an input mode for receiving, as an input, a touch operation made on a button, a touch panel, or the like included in the operation target device.

CITATION LIST

Patent Literature

Japanese Patent Application Publication No. 2003-131785

SUMMARY OF INVENTION

Technical Problem

However, there might occur a case where when a user attempts to make a switch operation for switching from the input mode for receiving, as an input, a touchless operation specified by a sign made by the user with part of his body to the input mode for receiving a touch operation an input, a specific touchless operation is detected and as a result processing that corresponds to the specific touchless operation is performed with no intention of the user.

Assume, for example, that an operation target device includes a particular button for making a switch operation, and performs particular processing that corresponds to a touchless operation made on the operation target device by the user such as placement of the user's palm over the operation target device. In such a case, there might occur that the operation target device detects a sign of a hand of the user who is attempting to press the particular button to make a switch operation as the touchless operation of placing a palm over the operation target device, and as a result performs the particular processing with no intention of the user.

Then, the user mostly needs to make an operation to cancel the particular processing that has been performed with no intention of the user (so-called "undo processing").

The present invention was made in view of the above problem, and aims to provide an information processing device capable of, when a user is attempting to make a switch operation for switching from a mode for receiving a touchless operation specified by a sign made by the user with part of his body as an input to a mode for receiving a touch operation as an input, avoiding the user's trouble of having to making an operation for canceling processing that has been performed with no intention of the user.

Solution to Problem

In order to solve the above problem, one aspect of the present invention provides an information processing device comprising: a touch operation detection unit operable to detect a touch operation made on a body of the information processing device; a touchless operation detection unit operable to detect a sign made by part of a user's body, as a touchless operation made with no touch on the body of the information processing device; a switch detection unit operable to detect a switch operation for switching an input mode from a first input mode to a second input mode, the switch operation being made with a touch on the body of the information processing device, the first input mode being for receiving, as an input, a touchless operation detected by the touchless operation detection unit, and the second input mode being for receiving, as an input, a touch operation detected by the touch operation detection unit; a processing unit operable to perform processing in accordance with an instruction; and a control unit operable, in the first input mode, to receive, as an input, a touchless operation detected by the touchless operation detection unit, and issue a first instruction to the processing unit to start processing that corresponds to the received touchless operation, and if the switch detection unit detects a switch operation within a predetermined time period after the reception of the touchless operation, to issue a second instruction to the processing unit to set an output status obtained as a result of the processing started by the processing unit in accordance with the first instruction to an output status which has been obtained before the start of the processing.

In order to solve the above problem, another aspect of the present invention provides an information processing device comprising: a touch operation detection unit operable to detect a touch operation made on a body of the information processing device; a touchless operation detection unit operable to detect a sign made by part of a user's body, as a touchless operation made with no touch on the body of the information processing device; a switch detection unit operable to detect a switch operation for switching an input mode from a first input mode to a second input mode, the switch operation being made with a touch on the body of the information processing device, the first input mode being for receiving, as an input, a touchless operation detected by the touchless operation detection unit, and the second input mode being for receiving, as an input, a touch operation detected by the touch operation detection unit; a processing unit operable to perform processing in accordance with an instruction; and a control unit operable, in the first input mode, to receive, as an input, a touchless operation detected by the touchless operation detection unit, if the switch detection unit does not detect a switch operation within a predetermined time period after the reception of the touchless operation, to issue an instruction to the processing unit to start processing that corresponds to the received touchless operation, and if the switch detection unit detects a switch operation within the predetermined time period after the reception of the touchless operation, not to issue the instruction to the processing unit to start the processing that corresponds to the received touchless operation.

Advantageous Effects of Invention

According to the information processing device relating to the aspects of the present invention with the above structure, when a user is attempting to make a switch operation for switching from a mode for receiving a touchless operation specified by a sign made by the user with part of his body as an input to a mode for receiving a touch operation as an input, it is possible to avoid the user's trouble of having to making an operation for canceling processing that has been performed with no intention of the user.

BRIEF DESCRIPTION OF DRAWINGS

FIG. 1 shows an exterior appearance of an information processing device 100 relating to Embodiment 1.

FIG. 2A to FIG. 2E each show an example of a hand sign made by a user detectable as a touchless operation by the information processing device 100.

FIG. 4A to FIG. 4C show that the information processing device 100 detects a hand sign made by the user who is attempting to press a switch button 131 as the Palm sign, and performs wipe-in display of the ingredients screen G2.

FIG. 5A to FIG. 5C show that the switch button 131 is pressed within a predetermined time period (of approximately some seconds, for example) after detection of the Palm sign, and the information processing device 100 performs wipe-out display of the ingredients screen G2.

DESCRIPTION OF EMBODIMENTS

Figure 3A:
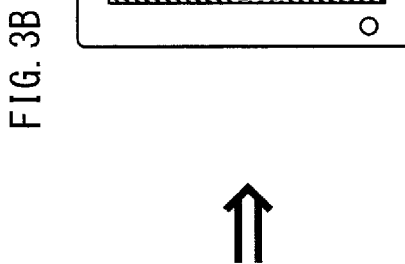
FIG. 3A to FIG. 3D show that in the case where the user makes a Palm sign with his hand, a screen being displayed on a touch panel unit 110 switches from a recipe screen G1a to an ingredients screen G2.

The following describes an embodiment of an information processing device relating to the present invention, with reference to the drawings.

<Embodiment 1>
<Exterior Appearance>

FIG. 1 shows an exterior appearance of an information processing device 100 relating to Embodiment 1.

The information processing device 100 is a so-called personal computer capable of executing various types of applications. As shown in FIG. 1, the information processing device 100 includes a touch panel unit 110, a camera 121, a switch button 131, and a speaker 140.

The information processing device 100 has two input modes, namely, a first input mode and a second input mode. When a user presses the switch button 131, the information processing device 100 switches the input mode between the first input mode and the second input mode.

The first input mode is a mode for receiving, as an input, a touchless operation (described in detail later) detected based on images photographed by the camera 121. The second input mode is for receiving, as an input, a touch operation made on the touch panel unit 110.

For example, in the case where the user hopes to operate the information processing device 100 in a position distant from the information processing device 100, the first input mode is used. In the case where the user hopes to operate the information processing device 100 in a position close to the information processing device 100, the second input mode is used.

<Specifications of User Interface>

The following describes examples of display and operations of the information processing device 100, with reference to FIG. 1 to FIG. 8A and FIG. 8B.

FIG. 1 shows an example where a recipe screen G1a for sweets is being displayed on the touch panel unit 110.

Here, the recipe screen G1a is a screen to be displayed while the information processing device 100 executes an application for recipe display. The recipe screen G1a is generated by overlaying buttons B1 to B3 on partial data 11 included in recipe image data 10 for sweets shown in FIG. 8A.

Note that the area of the partial data 11 to be displayed (hereinafter, "display size") has been determined beforehand in accordance with the size of the touch panel unit 110 and locations of the buttons.

FIG. 2A to FIG. 2E each show an example of a hand sign made by the user detectable as a touchless operation by the information processing device 100.

Assume a case where, in the first input mode, the user makes any one of the respective hand signs shown in FIG. 2A to FIG. 2E with his hand, and the information processing device 100 detects the hand sign as a touchless operation. In this case, the information processing device 100 switches a screen to be displayed on the touch panel unit 110 to a screen that corresponds to the detected touchless operation.

Note that as long as the user makes a hand sign which is similar to a certain degree to any one of the respective hand signs shown in FIG. 2A to FIG. 2E, the information processing device 100 detects the hand sign made by the user as a touchless operation.

Hereinafter, the respective hand signs shown in FIG. 2A to FIG. 2E are referred to as "Palm sign", "Fist sign", "Peace sign", "Up sign", and "Down sign", respectively.

Firstly, a case is described, where the user makes the Palm sign shown in FIG. 2A with his hand.

FIG. 3A to FIG. 3D show that in the case where the user makes the Palm sign shown in FIG. 2A with his hand, a screen being displayed on the touch panel unit 110 switches from the recipe screen G1a to an ingredients screen G2.

Assume a case where, in the first input mode, the user makes the Palm sign shown in FIG. 2A with his hand while the recipe screen G1a is displayed on the touch panel unit 110, as shown in FIG. 3A.

Figure 3B:
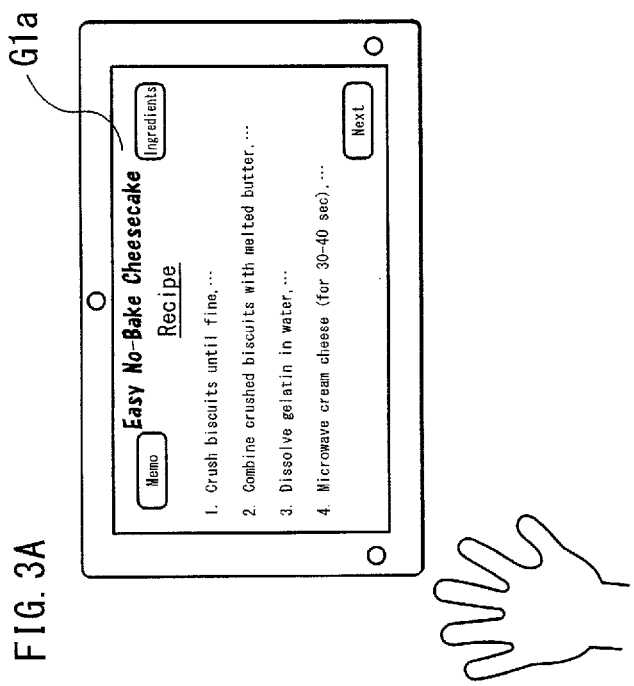
Figure 3D:
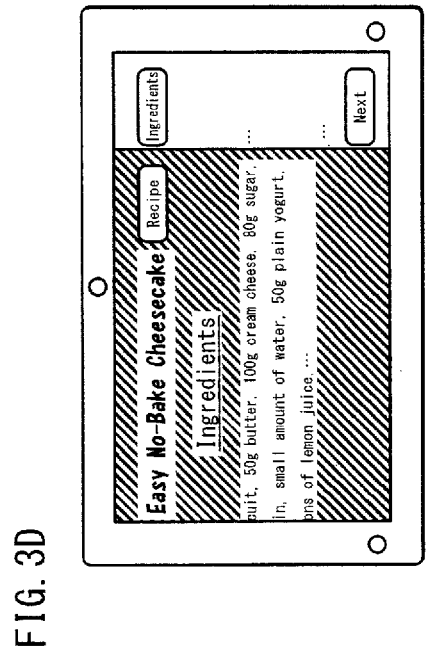
Figure 3C:
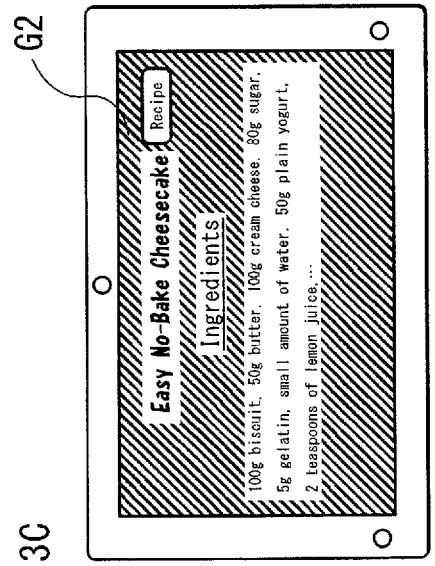

In the case where the information processing device 100 detects this hand sign of the user as a touchless operation, the information processing device 100 switches a screen to be displayed on the touch panel unit 110 from the recipe screen G1a to the ingredients screen G2, as shown in FIG. 3B to FIG. 3D. In other words, the information processing device 100 performs display on the touch panel unit 110 such that a display size of the ingredients screen G2 to be overlaid on the recipe screen G1a gradually increases over time.

Hereinafter, to switch a screen to be displayed on the touch panel unit 110 from a screen A to a screen B in this way is represented as "to perform wipe-in display" of the screen B.

Note that, also in the second input mode, in the case where the user touches the "Ingredients" button B1 shown in FIG. 1 with his finger or the like, a screen to be displayed on the touch panel unit 110 switches from the recipe screen G1a to the ingredients screen G2, as shown in FIG. 3A to FIG. 3D.

Hereinafter, to touch a display position of each of the buttons being displayed on the touch panel unit 110 with the user's finger or the like is represented as "to select a button".

Here, in the first input mode, in the case where the user unintentionally makes a hand sign similar to the Palm sign, the information processing device 100 has possibilities of detecting this unintentional hand sign as a touchless operation, thereby to perform wipe-in display of the ingredients screen G2.

FIG. 4A to FIG. 4C show in the case where a hand sign made by the user who is moving close to the information processing device 100 so as to attempt to press the switch button 131, the information processing device 100 detects this hand sign as the Palm sign, and performs wipe-in display of the ingredients screen G2.

In the case where the switch button 131 is pressed within a predetermined time period (of approximately some seconds, for example) after detection of the Palm sign, the information processing device 100 returns a screen to be displayed on the touch panel unit 110 back to the recipe screen G1a, as shown in FIG. 5A to FIG. 5C. In other words, the information processing device 100 performs display on the touch panel unit 110 such that a display size of the ingredients screen G2 to be overlaid on the recipe screen G1a gradually decreases over time.

Hereinafter, to return a screen to be displayed on the touch panel unit 110 from the screen B back to the screen A in this way is represented as "to perform wipe-out display" of the screen B.

Assume a case where, in the first input mode, the information processing device 100 detects a hand sign of the user who is moving close to the information processing device 100 so as to attempt to press the switch button 131, as the Palm sign, and starts wipe-in display. Even in such a case, it is possible for the user to return a screen to be displayed on the touch panel unit 110 back to a screen that has been displayed before detection of the Palm sign, by pressing the switch button 131 within the predetermined time period after detection of the Palm sign, as shown in FIG. 4A to FIG. 5C.

That is, according to the information processing device 100, in the first input mode, the user has no need to make any operation for canceling processing, which has been performed with no intention of the user in spite of attempting to make a switch operation.

The following briefly describes other examples of display and operations by the information processing device 100.

Figure 6A:
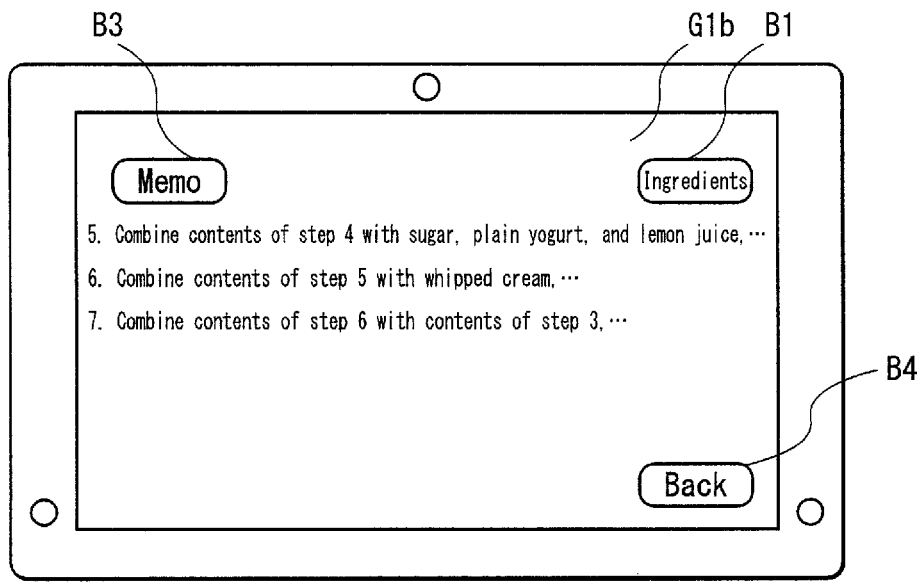
FIG. 6A and FIG. 6B show examples of display of a recipe screen G1b and a memo screen G3, respectively.
Figure 6B:
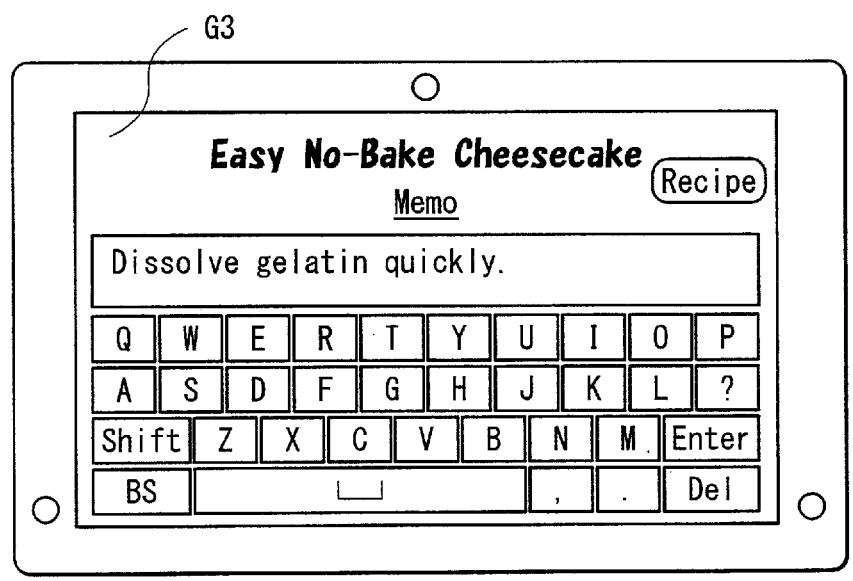

In the first input mode, in the case where the user makes the Fist sign shown in FIG. 2B with his hand while the recipe screen G1a shown in FIG. 1 is displayed, the information processing device 100 performs wipe-in display of a recipe screen G1b shown in FIG. 6A. In the first input mode, also in the case where the user makes the Peace sign shown in FIG. 2C with his hand while the recipe screen G1a shown in FIG. 1 is displayed, the information processing device 100 performs wipe-in display of a memo screen G3 shown in FIG. 6B.

Figure 8A:
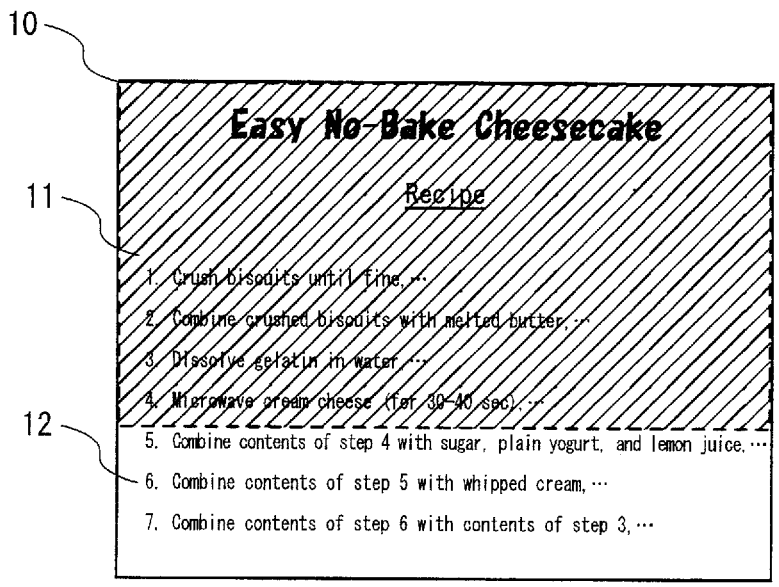
FIG. 8A and FIG. 8B show the relationship between recipe image data 10 and partial data 11 and the relationship between enlarged recipe image data 20 and partial data 21, respectively.
Figure 8B:
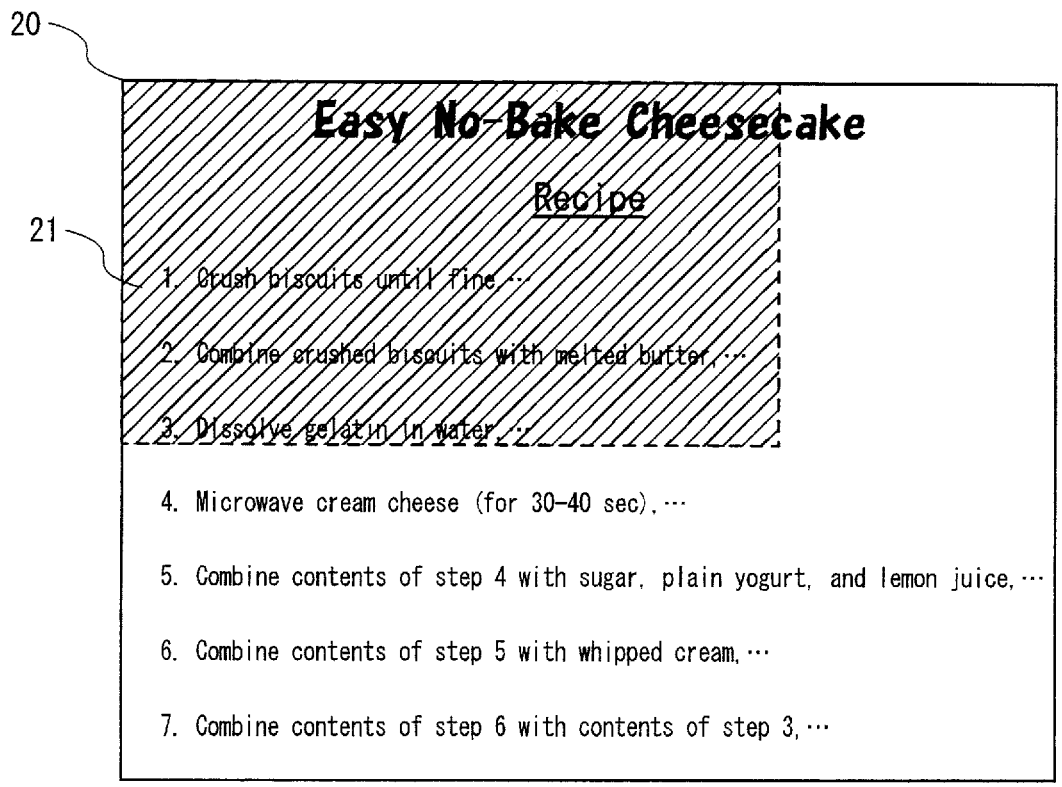

Here, the recipe screen G1b is a screen generated by overlaying the buttons B1, B3, and B4 on partial data 12 included in the recipe image data 10 shown in FIG. 8A.

Note that, in the second input mode, in the case where the "Next" button B2 is selected while the recipe screen G1a shown in FIG. 1 is displayed, the information processing device 100 performs wipe-in display of the recipe screen G1b in the same manner as in detection of the Fist sign in the first input mode. Also, in the second input mode, in the case where the "Memo" button B3 is selected while the recipe screen G1a shown in FIG. 1 is displayed, the information processing device 100 performs wipe-in display of the memo screen G3 in the same manner as in detection of the Peace sign in the first input mode.

In other words, according to the information processing device 100, in the first input mode, by the user making the Palm sign with his hand, it is possible to perform processing (wipe-in display of the ingredients screen G2 in the example of FIG. 1), which is to be performed in the second input mode in response to selection of the button located in the upper right on the displayed screen (the "Ingredients" button B1 in the example of FIG. 1).

Similarly, in the first input mode, by the user making the Fist sign with his hand, it is possible to perform processing, which is to be performed in the second input mode in response to selection of the button located in the lower right on the displayed screen. Moreover, in the first input mode, by the user making the Peace sign with his hand, it is possible to perform processing, which is to be performed in the second input mode in response to selection of the button located in the upper left on the displayed screen.

Figure 7A:
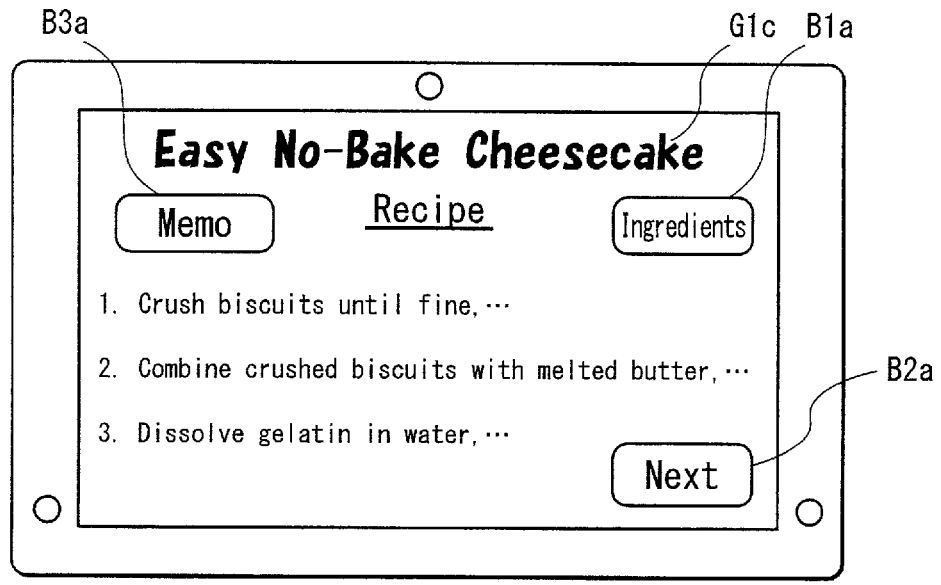
FIG. 7A and FIG. 7B show examples of display of a recipe screen G1c and a recipe screen G1d, respectively.
Figure 7B:
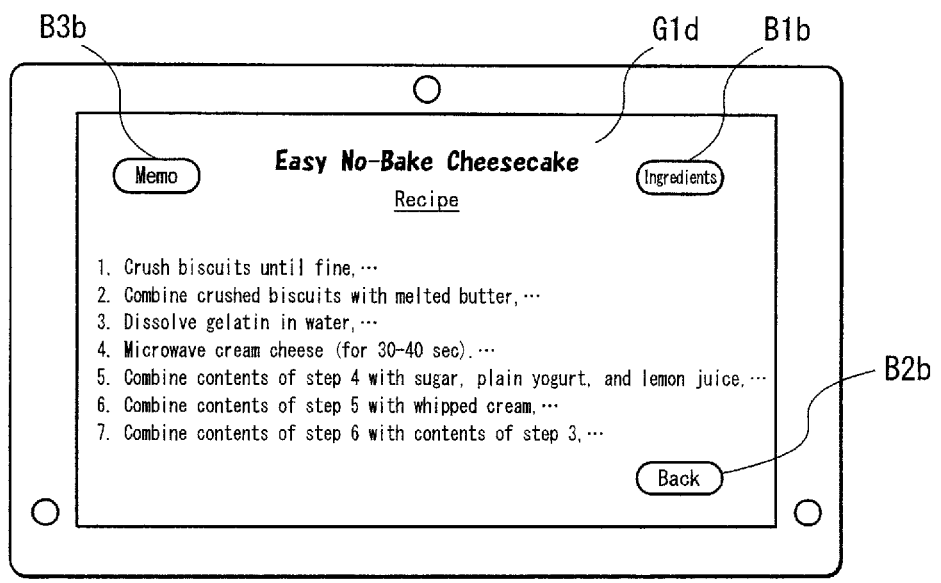

Also, in the first input mode, in the case where the user makes the Up sign shown in FIG. 2D with his hand while the recipe screen G1a shown in FIG. 1 is displayed, a recipe screen G1c shown in FIG. 7A is displayed. Similarly, in the first input mode, in the case where the user makes the Down sign shown in FIG. 2E with his hand while the recipe screen G1a shown in FIG. 1 is displayed, a recipe screen G1d shown in FIG. 7B is displayed.

Here, the recipe screen G1c is a screen generated by overlaying buttons B1a to B3a on partial data 21 having a display size whose origin is positioned at the upper left vertex of enlarged recipe image data 20 (see FIG. 8B), which results from enlarging the recipe image data 10 shown in FIG. 8A at a predetermined rate.

Figure 9:
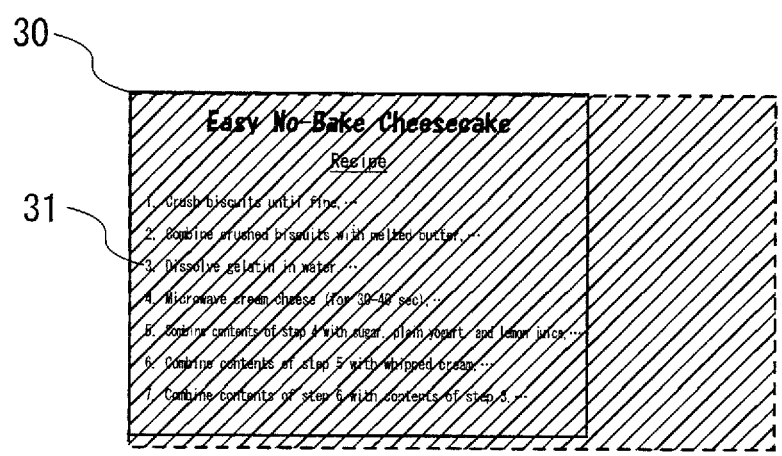
FIG. 9 shows the relationship between reduced recipe image data 30 and partial data 31.

Also, the recipe screen G1d is a screen generated by overlaying the buttons B1a to B3a on partial data 31 having a display size whose origin is positioned at the upper left vertex of reduced recipe image data 30 (see FIG. 9), which results from reducing the recipe image data 10 shown in FIG. 8A at a predetermined rate. In this example, the partial data 31 has a display size larger than the reduced recipe image data 30, and accordingly the whole of the reduced recipe image data 30 is displayed.

<Structure>

Figure 10:
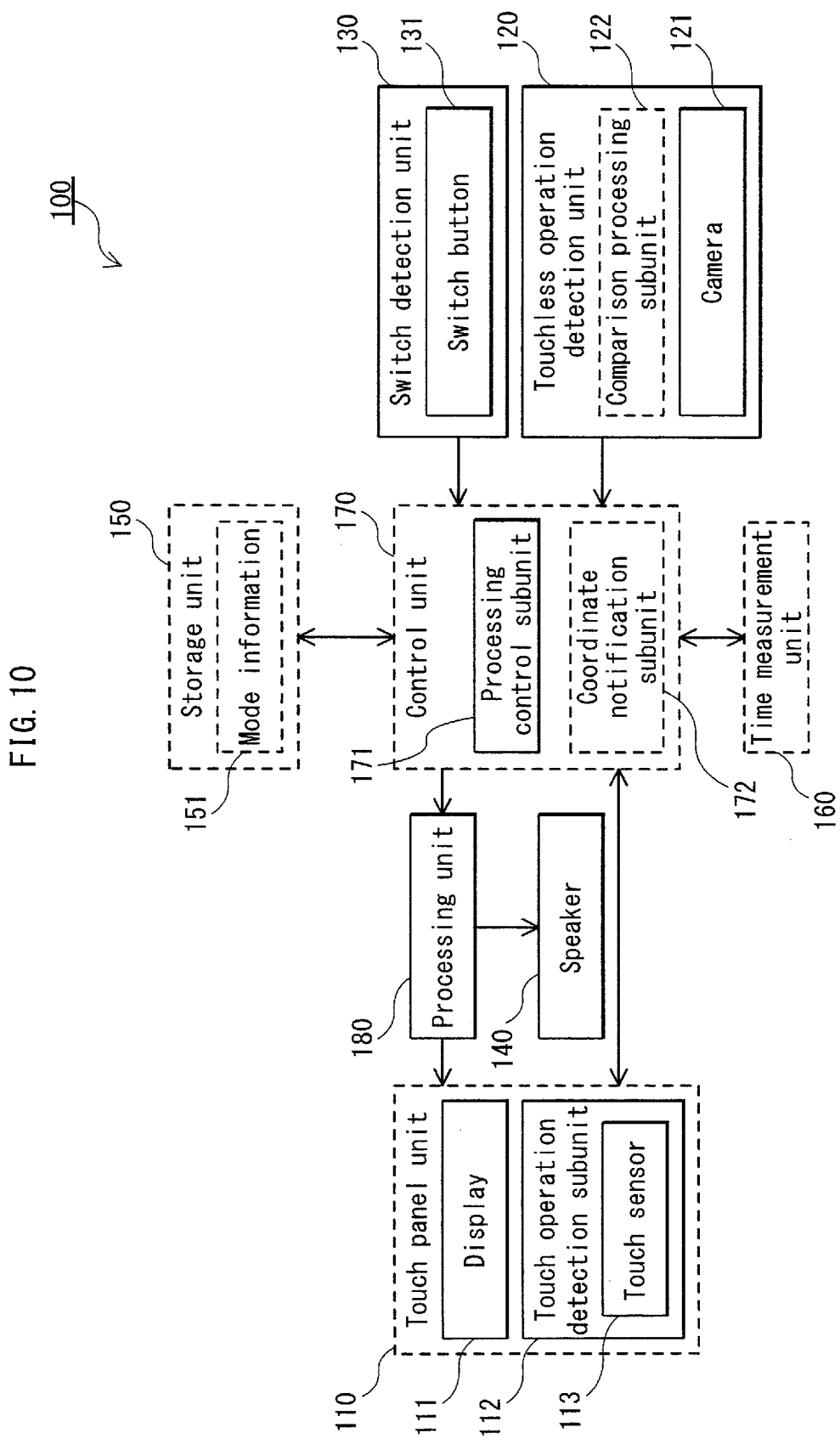
FIG. 10 is a block diagram showing the functional structure of main units of the information processing device 100.

FIG. 10 is a block diagram showing the functional structure of main units of the information processing device 100.

The information processing device 100 includes, as shown in FIG. 10, a touch panel unit 110, a touchless operation detection unit 120, a switch detection unit 130, a speaker 140, a storage unit 150, a time measurement unit 160, a control unit 170, and a processing unit 180.

The information processing device 100 includes a processor and a memory. The functions of the control unit 170 and the processing unit 180 are realized by the processor executing a program stored in the memory.

Here, the touch panel unit 110 includes a display 111 and a touch operation detection subunit 112.

The display 111 includes an LCD (Liquid Crystal Display). The display 111 displays images on the LCD such as letters and icons in accordance with an instruction issued by the processing unit 180.

Also, the touch operation detection subunit 112 includes a touch sensor 113. The touch operation detection subunit 112 detects a touch made thereon by the user, and transmits coordinate values (x,y) indicating a position of the touch to the control unit 170 per unit of time (such as per 25 ms) while detecting the touch.

The touch sensor 113 is embodied by a capacitive touch sensor, for example.

The following description is made on the assumption that, in FIG. 1, the upper left vertex and the lower right vertex of the touch panel unit 110 have coordinate values (0,0) and (799, 479), respectively.

Note that, in the present embodiment, the status of "touch" includes, in addition to a status where the user's body such as his finger, a touch pen, or the like is in touch with the touch panel unit 110, a status where the user's body such as his finger, a touch pen, or the like is adjacent to the touch panel unit 110 to an extent where the electrostatic capacitance of the touch panel unit 110 equals to or exceeds a predetermined threshold.

Also, the touchless operation detection unit 120 includes a camera 121 and a comparison processing subunit 122.

The camera 121 performs photographing at a constant frame rate to sequentially generate pieces of image data.

Also, the comparison processing subunit 122 stores therein pieces of template information indicating features of the respective hand signs shown in FIG. 2A to FIG. 2E. Each time the camera 121 generates a piece of image data, the comparison processing subunit 122 extracts a feature of the generated piece of image data, and compares the extracted feature with each of the features indicated by the pieces of template information so as to specify a hand sign. Then, the comparison processing subunit 122 transmits information indicating the specified hand sign (hereinafter, "touchless operation identifier") to the control unit 170. In other words, this touchless operation identifier indicates any one of the respective hand signs shown in FIG. 2A to FIG. 2E.

The comparison processing subunit 122 includes a dedicated processor realizing the above function of the comparison processing subunit 122.

Also, the switch detection unit 130 includes a switch button 131, which is a hardware button. When the switch button 131 is pressed, the switch detection unit 130 transmits a signal indicating to switch the input mode (hereinafter, "switch signal") to the control unit 170.

Also, the speaker 140 outputs audio in accordance with an instruction issued by the processing unit 180.

Also, the storage unit 150 is a memory region for storing mode information 151.

Here, the mode information 151 is information indicating the current input mode.

The time measurement unit 160 starts measuring a predetermined time period (of approximately some seconds in this example) in accordance with an instruction issued by the control unit 170. When completing measuring the predetermined time period, the time measurement unit 160 transmits a notification indicating the completion to the control unit 170. The time measurement unit 160 is embodied by a timer, a counter, or the like.

The predetermined time period is based on the average time period from when the user is moving close to the information processing device 100 so as to attempt to press the switch button 131 at a distance (of approximately 1 m, for example) enough to detect a hand sign made by the user to when the switch button 131 is actually pressed.

The control unit 170 especially updates the mode information 151 stored in the storage unit 150 based on reception of a switch signal transmitted from the switch detection unit 130. Also, the control unit 170 controls the processing unit 180 to perform processing, based on the mode information 151, the information received from the touch operation detection subunit 112 or the touchless operation detection unit 120, and reception of the switch signal transmitted from the switch detection unit 130.

The control unit 170 includes a processing control subunit 171 and a coordinate notification subunit 172.

The processing control subunit 171 especially issues, to the processing unit 180, an instruction to start processing and an instruction to perform undo processing.

Upon receiving a touchless operation identifier from the touchless operation detection unit 120, the processing control subunit 171 issues an instruction to start processing. If receiving a switch signal from the switch detection unit 130 within the predetermined time period after reception of this touchless operation identifier, the processing control subunit 171 issues the instruction to perform undo processing. Upon receiving the touchless operation identifier from the touchless operation detection unit 120, the processing control subunit 171 instructs the time measurement unit 160 to start measuring this predetermined time period.

Here, the instruction to start processing is an instruction to start processing to be performed in accordance with an application being executed by the processing unit 180, and designates a touchless operation identifier received from the touchless operation detection unit 120 in the case where the mode information 151 indicates the first input mode.

For example, an instruction to start processing, which is to be issued during execution of the application for recipe display by the processing unit 180 as shown in FIG. 1, is an instruction to start processing of switching a screen to be displayed on the display 111 to a screen that corresponds to a touchless operation indicated by a touchless operation identifier designated by the instruction.

Also, the instruction to perform undo processing is an instruction to stop the processing, which has been started by the processing unit 180 in accordance with the above instruction to start processing, and set an output status obtained as a result from the performance of the processing to an output status that has been obtained before the start of the processing.

For example, an instruction to perform undo processing, which is issued during execution of the application for recipe display by the processing unit 180 as shown in the above example, is an instruction to perform processing of returning a screen to be displayed on the display 111 back to the recipe screen G1a shown in FIG. 1 which has been displayed before the start of the processing in accordance with the above instruction to start processing.

Also, in the case where the mode information 151 stored in the storage unit 150 indicates the second input mode, the coordinate notification subunit 172 transmits, to the processing unit 180, coordinate values received from the touch operation detection subunit 112.

Also, the processing unit 180 performs processing on an application being executed in accordance with the coordinate values and instruction received from the control unit 170.

Note that the processing unit 180 manages processing to be performed in accordance with an operation (touch operation or touchless operation), for each of the size, shape, location (coordinate values) of each of the buttons overlaid on a screen being displayed on the display 111 or for each screen being displayed.

For example, upon receiving coordinate values and an instruction to start processing from the control unit 170 during execution of the application for recipe display, the processing unit 180 performs wipe-in display in the following manner.

Specifically, the processing unit 180 stores, in the memory included in the information processing device 100, an image that has been displayed on the display 111 immediately before wipe-in display has started (hereinafter, "previous image") and an image to be displayed on the display 111 immediately after the wipe-in display completes (hereinafter, "subsequent image").

Then, the processing unit 180 performs wipe-in display, namely, repeatedly generates a combined image from the previous image and part of the subsequent image and displays the generated combined image. This is in order to gradually increase a display size of the subsequent image to be combined with the previous image, and display all of the subsequent image at completion of measurement of the predetermined time period performed by the time measurement unit 160.

Also, upon receiving an instruction to perform undo processing from the control unit 170 during execution of the application for recipe display, the processing unit 180 stops the wipe-in display, and performs wipe-out display in the following manner.

Specifically, the processing unit 180 repeatedly generates a combined image and displays the generated combined image, in the inverse order of the wipe-in display that has been performed in accordance with the above instruction to perform processing until reception of the instruction of perform undo processing.

In other words, upon receiving the instruction to perform undo processing, the processing unit 180 performs wipe-out display, namely, repeatedly generates a combined image from the previous image and part of the subsequent image and displays the generated combined image, such that the part of the subsequent image to be combined with the previous image gradually decreases in display size on the display 111 than the subsequent image and all of the previous image is finally displayed on the display 111.

<Operations>

Figure 11:
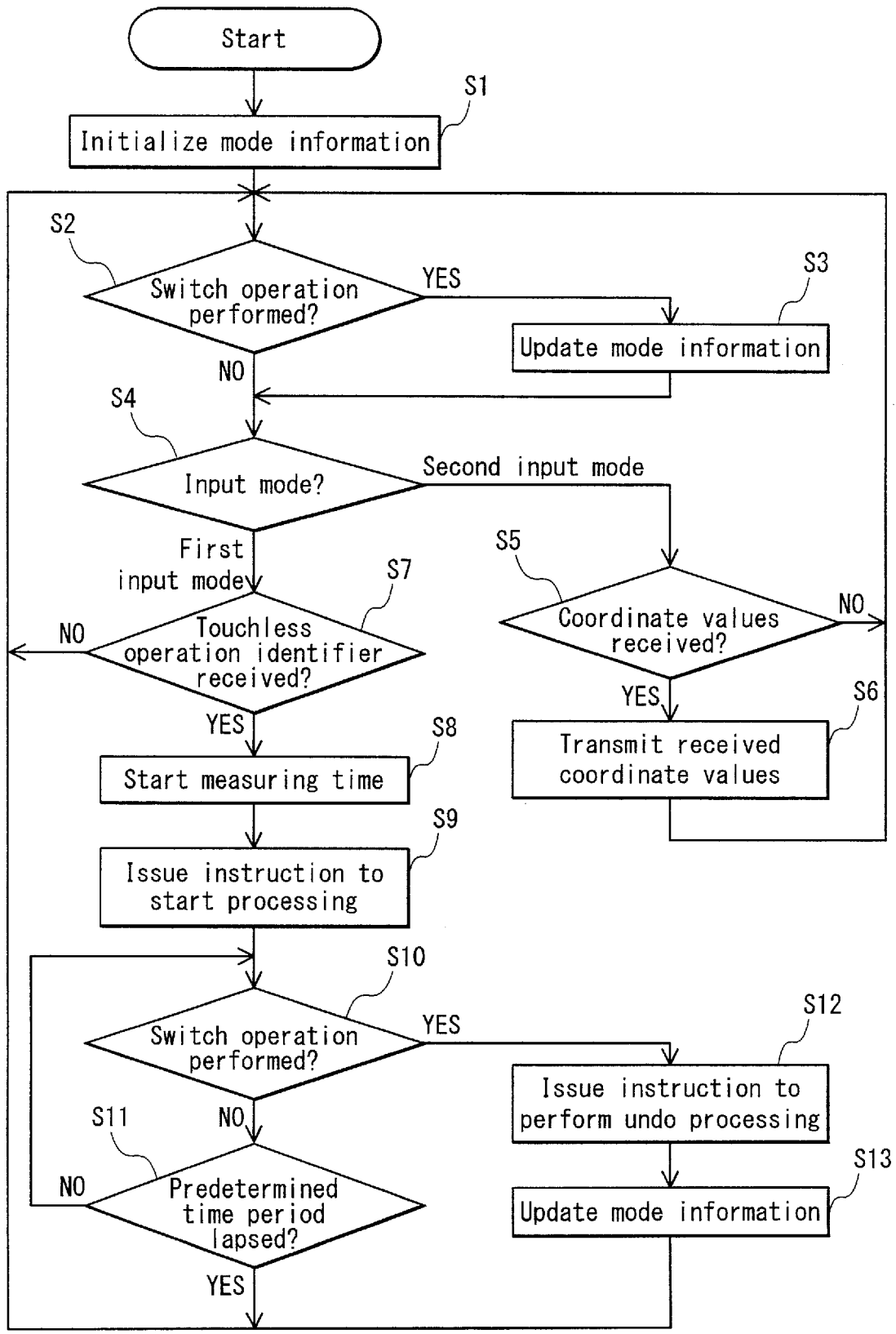
FIG. 11 is a flow chart showing control processing by a control unit 170 of the information processing device 100.

The following describes the operations of the information processing device 100 having the above structure, with reference to FIG. 11.

FIG. 11 is a flow chart showing control processing by the control unit 170 of the information processing device 100.

When powered-on, the information processing device 100 starts the control processing shown in FIG. 11. Also, although not specifically illustrated, when powered-off, the information processing device 100 ends the control processing.

Note that, in the following description, the recipe screen G1a has already been displayed on the display 111.

When the information processing device 100 is powered-on, the control unit 170 initializes the mode information to indicate the first input mode (Step S1), and judges whether a switch operation has been made (Step S2).

If receiving a switch signal from the switch detection unit 130, the control unit 170 judges that the switch operation has been made (Step S2: YES), and updates the mode information. In other words, in the case where the mode information has indicated the first input mode, the control unit 170 updates the mode information to indicate the second input mode. On the contrary, in the case where the mode information has indicated the second input mode, the control unit 170 updates the mode information to indicate the first input mode (Step S3). Then, the flow proceeds to processing of Step S4.

Also, if receiving no switch signal from the switch detection unit 130, the control unit 170 judges that no switch operation has been made (Step S2: NO), and performs no special processing. Then, the flow proceeds to processing of Step S4.

The control unit 170 judges which input mode of the first input mode and the second input mode the mode information indicates (Step S4). If the control unit 170 judges that the mode information indicates the second input mode (Step S4: Second input mode), the coordinate notification subunit 172 judges whether coordinate values have been received from the touch operation detection subunit 112 (Step S5).

If the coordinate notification subunit 172 judges that no coordinate values have been received (Step S5: NO), the flow returns to the processing of Step S2. If judging that coordinate values have been received (Step S5: YES), the coordinate notification subunit 172 transmits the received coordinate values to the processing unit 180 (Step S6).

Upon receiving the coordinate values, the processing unit 180 judges which range of one of buttons included in a screen being displayed on the display 111 the received coordinate values fall within. The processing unit 180 performs processing allocated to the range of the button within which the coordinate values fall.

In this example, the recipe screen G1a is displayed on the display 111. If the received coordinate values fall within a range of an "Ingredients" button B1, the processing unit 180 performs wipe-in display of the ingredients screen G2.

When the processing of Step S6 completes, the flow returns to Step S2 to perform processing.

On the contrary in Step S4, if the control unit 170 judges that the mode information indicates the first input mode (Step S4: First input mode), the processing control subunit 171 judges whether a touchless operation identifier has been received from the touchless operation detection unit 120 (Step S7).

If the processing control unit 171 judges that no touchless operation identifier has been received (Step S7: NO), the flow returns to the processing of Step S2. If judging that a touchless operation identifier has been received (Step S7: YES), the processing control subunit 171 controls the time measurement unit 160 to start measuring a predetermined time period (Step S8).

The processing control subunit 171 issues, to the processing unit 180, an instruction to start processing, which designates the touchless operation identifier received in Step S7 (Step S9).

Upon receiving the instruction to start processing, the processing unit 180 starts processing that corresponds to a touchless operation indicated by the touchless operation identifier designated by the received instruction to start processing.

In this example, the recipe screen G1a is displayed on the display 111. In the case where the touchless operation indicated by the designated touchless operation identifier is the Palm sign, the processing unit 180 starts wipe-in display of the ingredients screen G2 as shown in FIG. 4.

Next, the control unit 170 judges whether a switch operation has been made, in the same manner as in the processing of Step S2 (Step S10). If the control unit 170 judges that no switch operation has been made, the processing control unit 171 judges whether the predetermined time period has lapsed after the last touchless operation (Step S11).

If receiving no notification from the time measurement unit 160, the processing control unit 171 judges that the predetermined time period has not yet lapsed (Step S11: NO), and the flow returns to the processing of Step S10. If receiving a notification from the time measurement unit 160, the processing control unit 171 judges that the predetermined time period has lapsed (Step S11: YES), and performs no processing. Then, the flow returns to the processing of Step S2.

Also, in Step S10, if the control unit 170 judges that the switch operation has been made (Step S10: YES), the processing control unit 171 issues an instruction to perform undo processing to the processing unit 180 (Step S12).

Upon receiving the instruction to perform undo processing, the processing unit 180 stops the processing currently being performed (wipe-in display in the above example), and sets an output status obtained as a result of the performance of the processing to an output status that has been obtained before the start of the processing.

In the above example, since the wipe-in display of the ingredients screen G2 is being performed, the processing unit 180 stops the wipe-in display of the ingredients screen G2, and starts wipe-out display of the ingredients screen G2. Finally, the processing unit 180 displays the recipe screen G1a on the display 111, which has been displayed before the start of the wipe-in display of the ingredients screen G2.

Then, the processing control unit 171 updates the mode information in the same manner as in the processing of Step S3 (Step S13), and the flow returns to Step S2.

<Modification 1>

The above Embodiment 1 has described the operations of the information processing device 100, taking for example the case were an application for recipe display is being executed by the information processing device 100, with reference to FIG. 11. The following Modification 1 describes operations of the information processing device 100, taking for example a case where an application for music playback is being executed by the information processing device 100.

<Operations>

Figure 12A:
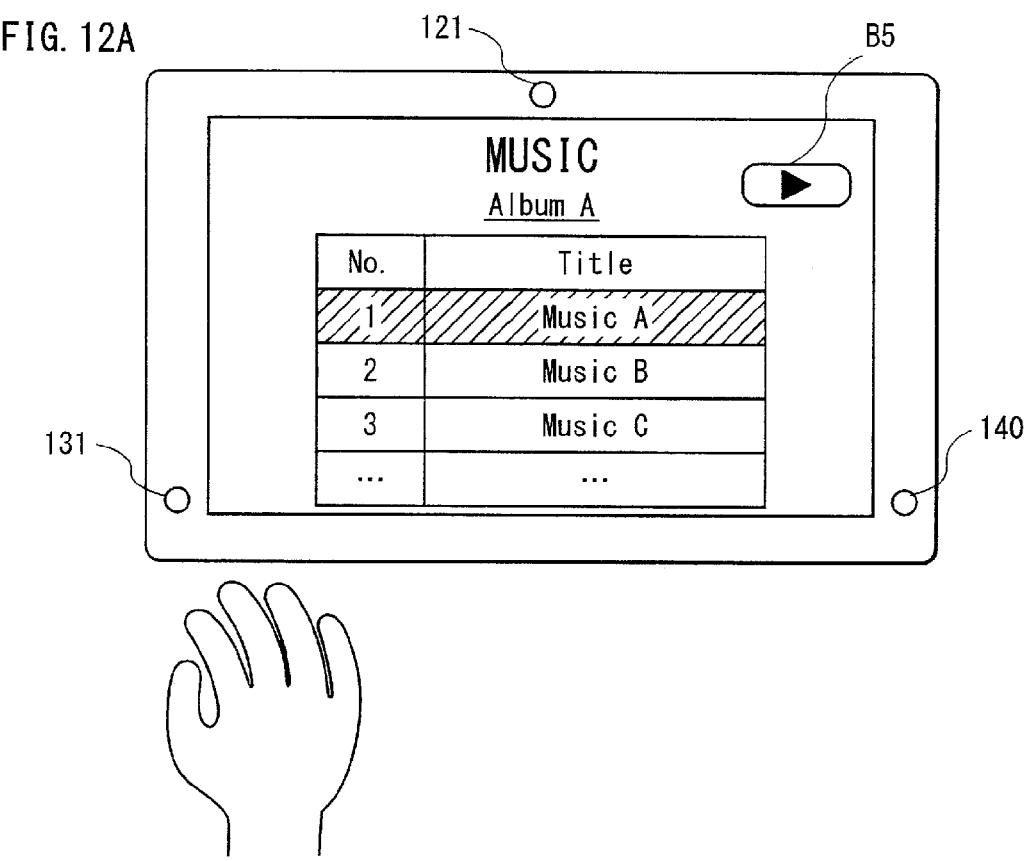
FIG. 12A and FIG. 12B show the outline of operations of the information processing device 100 that executes an application for music playback.
Figure 12B:
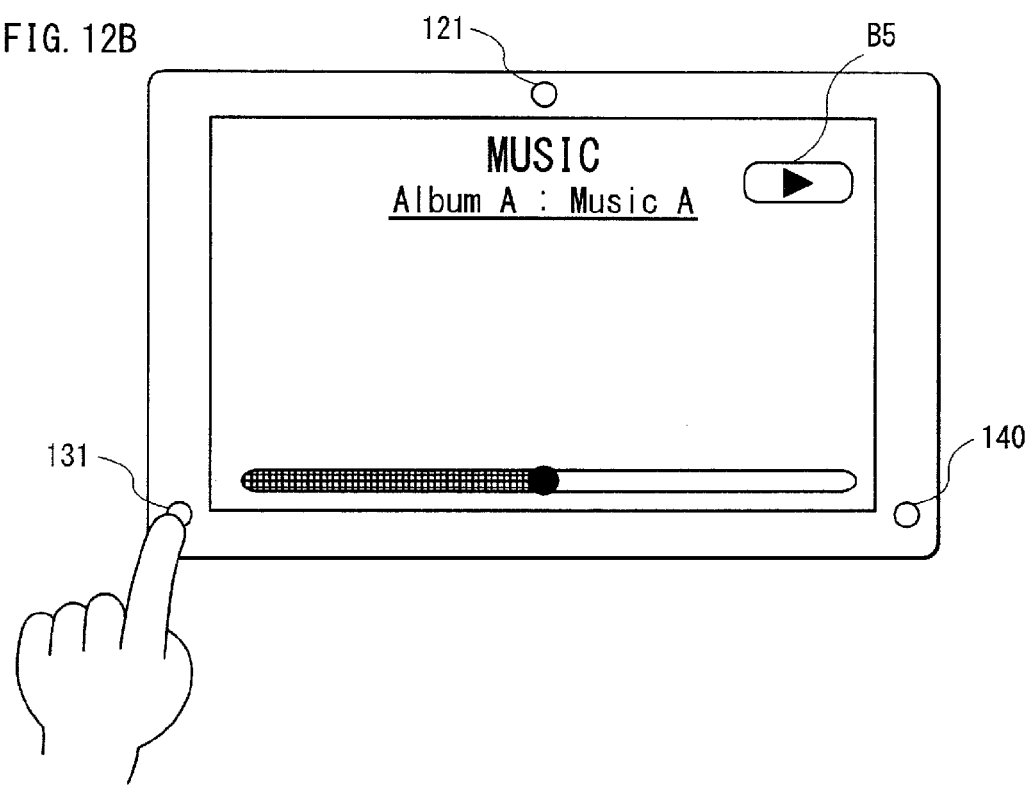

FIG. 12A and FIG. 12B show the outline of operations of the information processing device 100 that executes an application for music playback.

FIG. 12A shows that the information processing device 100 detects a hand sign made by the user who is attempting to press the switch button 131 as the Palm sign, and is to start playback of music whose title is "Music A" being selected (hereinafter, just "Music A") indicated by a shaded area in FIG. 12A.

When the processing unit 180 actually starts playback of the Music A, the speaker 140 outputs audio of the Music A.

FIG. 12B shows that the switch button 131 is pressed within a predetermined time period (of approximately some seconds, for example) after detection of the Palm sign, and the information processing device 100 stops playback of the Music A.

When playback of the Music A is stopped, output of the audio of the Music A, which has been output until then, is stopped.

Control processing by the information processing device 100 during execution of the application for music playback is the same as that shown in FIG. 11.

If receiving the coordinate values from the coordinate notification subunit 172 in Step S6, the processing unit 180 performs processing of playing back music being selected, which is allocated to a button in a range within which the coordinate values falls (a "Playback" button B5 in FIG. 12A, for example), namely, "Music A" in the example of FIG. 12A.

Also, in Step S9, the processing unit 180 receives the instruction to start processing issued by the processing control unit 171. In the case where a touchless operation indicated by the touchless operation identifier designated by the received instruction to start processing is the Palm sign, the processing unit 180 starts playback of music being selected ("Music A" in the example of FIG. 12A).

Also, in Step S12, the processing unit 180 receives the instruction to perform undo processing issued by the processing control unit 171, and stops playback of music currently being executed ("Music A" in the example of FIG. 12B).

<Modification 2>

The above Embodiment 1 has described, as an example, the case where when the user presses the switch button 131, the input mode is switched.

The following Modification 2 mainly describes the difference from the information processing device 100 relating to the Embodiment 1, taking for example a case where when connection to or disconnection from a cradle occurs, the input mode is switched.

<Exterior Appearance>

Figure 13:
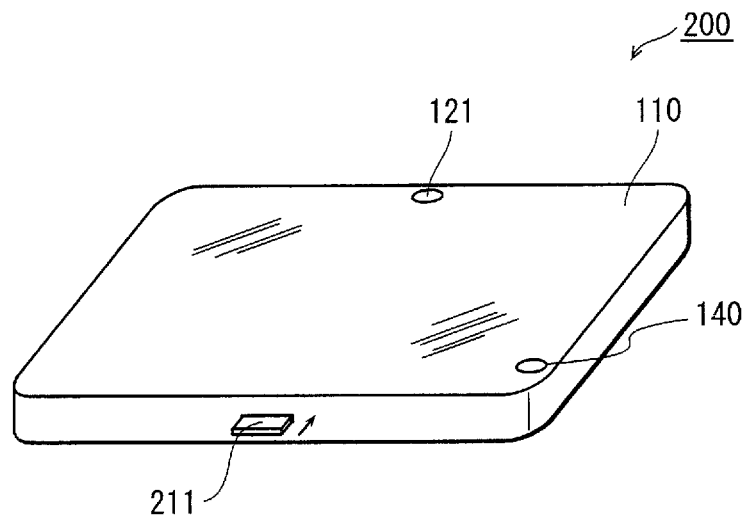
FIG. 13 shows an exterior appearance of an information processing device 200 relating to Modification 2.
Figure 14:
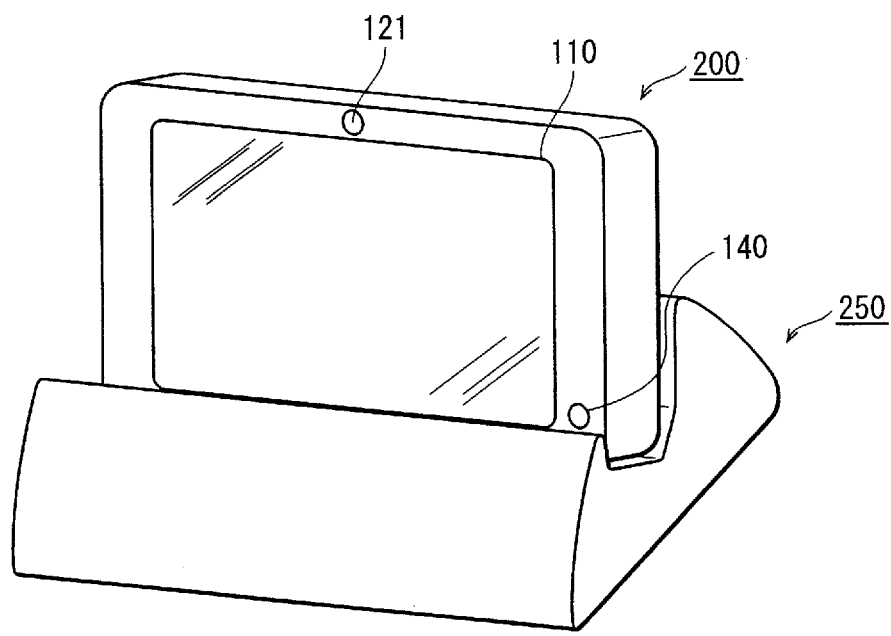
FIG. 14 shows the information processing device 200 that is connected to a cradle 250.

FIG. 13 shows an exterior appearance of an information processing device 200 relating to the Modification 2. FIG. 14 shows the information processing device 200 that is connected to a cradle 250.

The information processing device 200 includes, as shown in FIG. 13, a touch panel unit 110, a camera 121, a speaker 140, and a switch 211. The information processing device 200 differs from the information processing device 100 relating to the Embodiment 1 in that the information processing device 200 includes the switch 211 instead of the switch button 131 included in the information processing device 100.

The switch 211 is kept pressed while the information processing device 200 is connected to the cradle 250 as shown in FIG. 14. Conversely, the switch 211 is not pressed while the information processing device 200 is disconnected from the cradle 250.

The shape and location of the switch 211 shown in FIG. 13 are just an example, and may be appropriately modified as long as the switch 211 can be kept pressed while the information processing device 200 is connected to the cradle 250.

Figure 15:
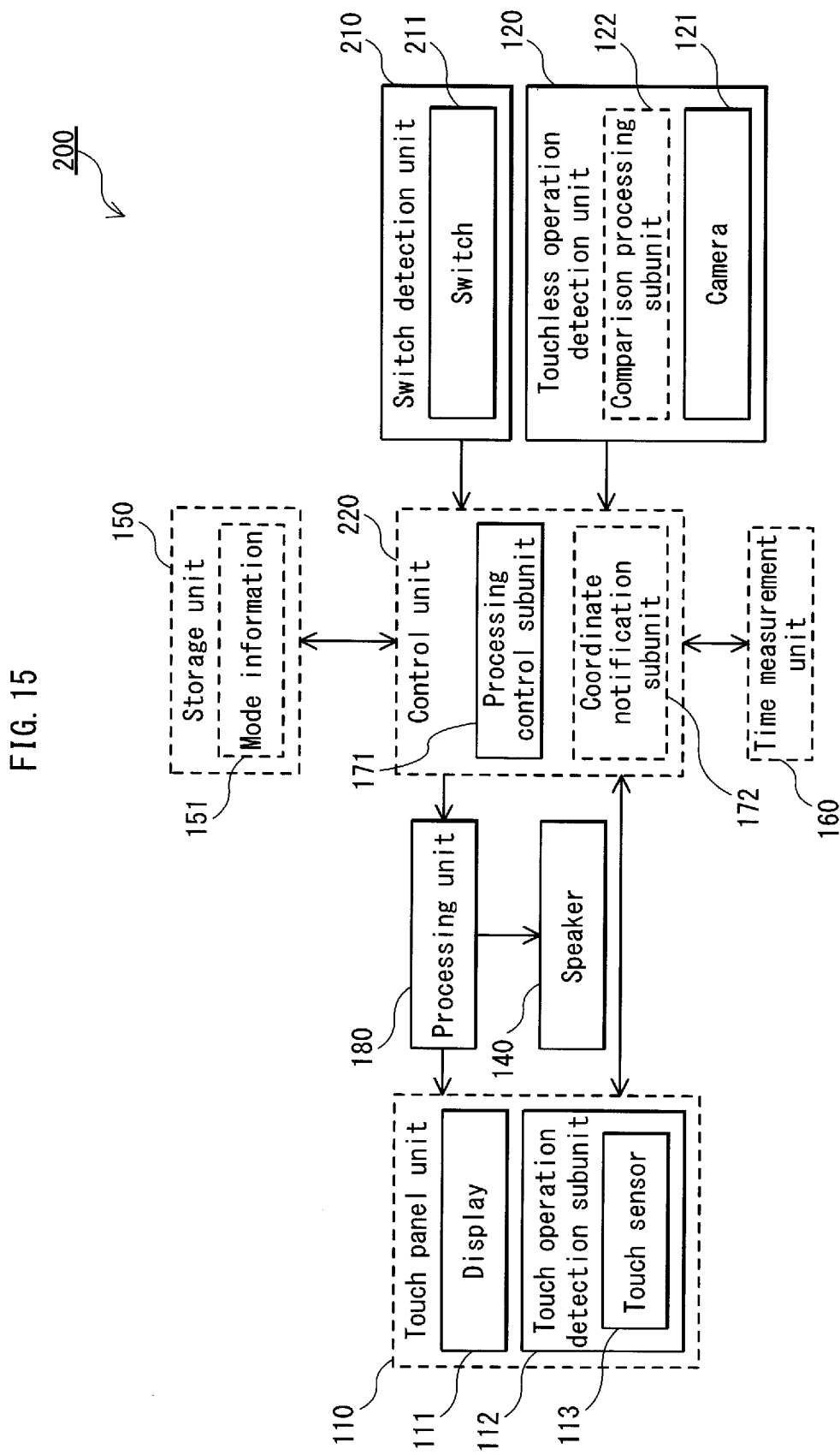
FIG. 15 is a block diagram showing the functional structure of main units of the information processing device 200.

<Structure> FIG. 15 is a block diagram showing the functional structure of main units of the information processing device 200.

The information processing device 200 includes, as shown in FIG. 15, the touch panel unit 110, a touchless operation detection unit 120, a switch detection unit 210, the speaker 140, a storage unit 150, a time measurement unit 160, a control unit 220, and a processing unit 180.

The information processing device 200 differs from the information processing device 100 relating to the Embodiment 1, in that the information processing device 200 includes the switch detection unit 210 and the control unit 220 instead of the switch detection unit 130 and the control unit 170 included in the information processing device 100, respectively.

Here, the switch detection unit 210 includes the switch 211. While the switch 211 is kept pressed, the switch detection unit 210 transmits, to the control unit 220, a signal indicating that the switch 211 is being pressed (hereinafter, "press signal").

Also, although the control unit 220 basically has the same functions of the control unit 170 relating to the Embodiment 1, the control unit 220 differs from the control unit 170 in that the control unit 220 updates the mode information 151 based on whether the transmission status of the press signal from the switch detection unit 210 has changed.

In other words, in the case where the transmission status has changed from a status where a press signal is transmitted to a status where no press signal is transmitted, it is regarded that the information processing device 200 is disconnected from the cradle 250. In such a case, the user is likely to make a touch operation on the touch panel unit 110.

Accordingly, in the case where the transmission status has changed to the status where no press signal is transmitted, the control unit 220 updates the mode information 151 to indicate the second input mode.

On the contrary, in the case where the transmission status has changed from the status where no press signal is transmitted to the status where a press signal is transmitted, it is regarded that the information processing device 200 is connected to the cradle 250. In such a case, the user is likely to make a touchless operation.

Accordingly, in the case where the transmission status has changed to the status where a press signal is transmitted, the control unit 220 updates the mode information 151 to indicate the first input mode.

<Operations>

Figure 16:
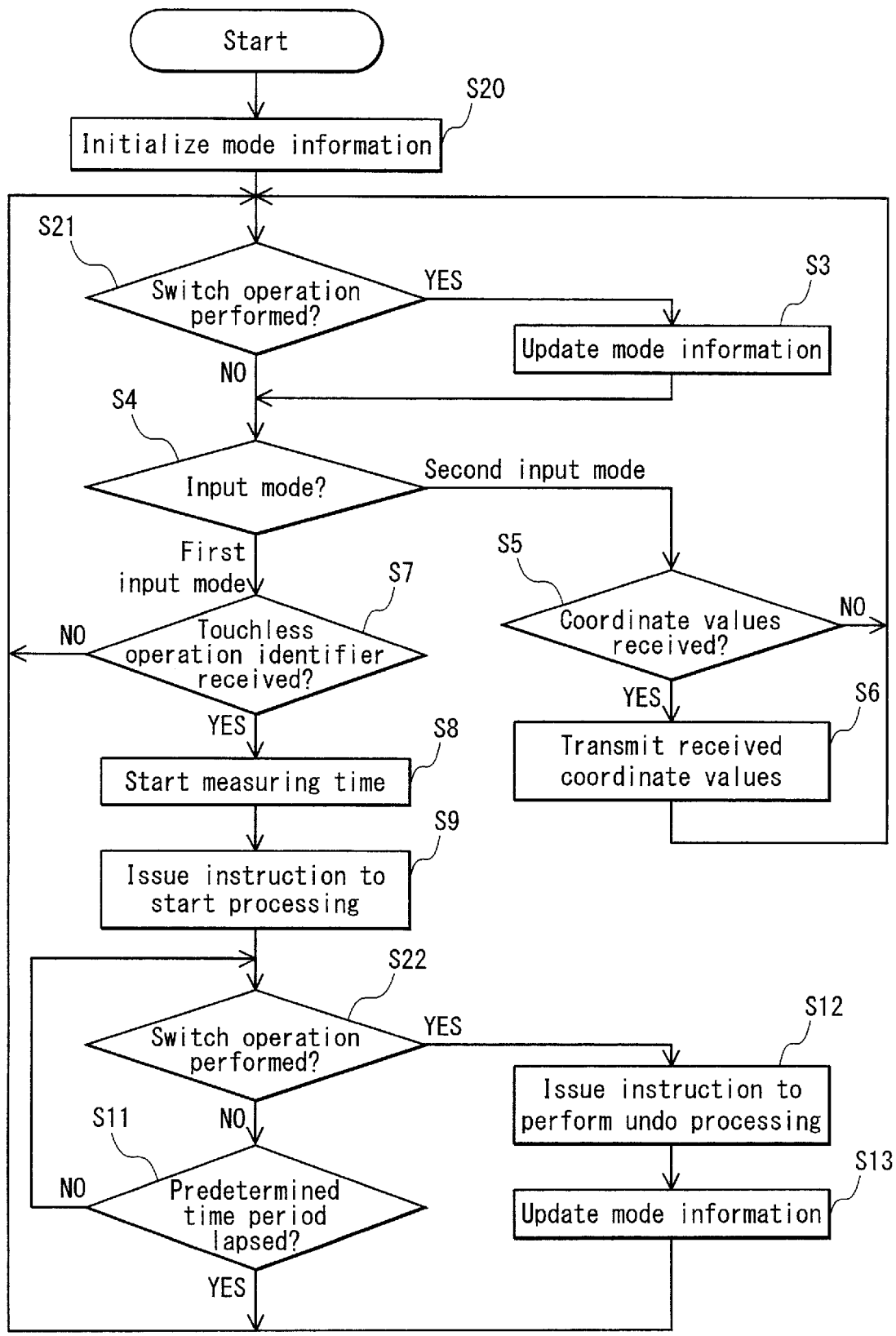
FIG. 16 is a flow chart showing control processing by a control unit 220 of the information processing device 200.

The following describes the operations of the information processing device 200 having the above structure, with reference to FIG. 16.

FIG. 16 is a flow chart showing control processing by the control unit 220 of the information processing device 200.

Control processing by the information processing device 200 differs from that by the information processing device 100 relating to the Embodiment 1, in that the control processing by the information processing device 200 includes Steps S20 to S22 instead of Steps S1, S2, and S10 shown in FIG. 11.

Accordingly, the following mainly describes the processing of Steps S20 to S22.

When the information processing device 200 is powered-on, the control unit 220 initializes the mode information (Step S20). If no press signal is transmitted from the switch detection unit 210, the control unit 220 initializes the mode information to indicate the second input mode. If a press signal is transmitted from the switch detection unit 210, the control unit 220 initializes the mode information to indicate the first input mode.

Then, the control unit 220 judges whether a switch operation has been made based on whether the transmission status of the press signal from the switch detection unit 210 has changed (Step S21).

If no press signal has been transmitted from the switch detection unit 210 before the processing of Step S21 and then transmission of a press signal starts, or if a press signal has been transmitted before the processing of Step S21 and then transmission of the press signal stops, the control unit 220 judges that a switch operation has been made (Step S21: YES). Then, the flow proceeds to Step S3 for processing of updating the mode information.

On the contrary, if no press signal has been transmitted from the switch detection unit 210 before the processing of Step S21 and then transmission of a press signal does not start, or if a press signal has been transmitted before the processing of Step S21 and then transmission of the press signal continues, the control unit 220 judges that no switch operation has been made (Step S21: NO). Then, the flow proceeds to Step S4 for processing of judging the input mode.

Processing of the subsequent Steps S4 to S9 are performed in the same manner as described in the Embodiment 1. When issuing of the instruction to start processing in Step S9 completes, the control unit 220 judges whether a switch operation has been made in the same manner as in Step S21 (Step S22).

If the control unit 220 judges that no switch operation has been made (Step S22: NO), the flow proceeds to Step S11 for judging whether the predetermined time period has lapsed. If the control unit 220 judges that a switch operation has been made (Step S22: YES), the flow proceeds to Step S12 for issuing an instruction to perform undo processing.

<Embodiment 2>

The Embodiment 1 has described on the information processing device 100 as shown in FIG. 11, that in the first input mode, in the case where a touchless operation is detected, processing is started in accordance with an instruction to start processing, and then, in the case where a switch operation is detected within the predetermined time period after detection of the touchless operation, undo processing is performed in accordance with an instruction to perform undo processing.

The following Embodiment 2 describes, instead of the case where processing is started in accordance with an instruction to start processing immediately after detection of a touchless operation, an example where only when no switch signal is received within a predetermined time period after detection of a touchless operation, the processing is started.

According to this structure, in the first input mode, the user has no need to make any operation for canceling processing, which has been performed with no intention of the user in spite of attempting to make a switch operation, like the Embodiment 1.

Also in this example, the input mode is switched based on a value detected by an acceleration sensor included in an information processing device relating to the Embodiment 2.

The following describes the information processing device relating to the Embodiment 2, focusing on the difference from the information processing device 100 relating to the Embodiment 1.

<Structure>

Figure 17:
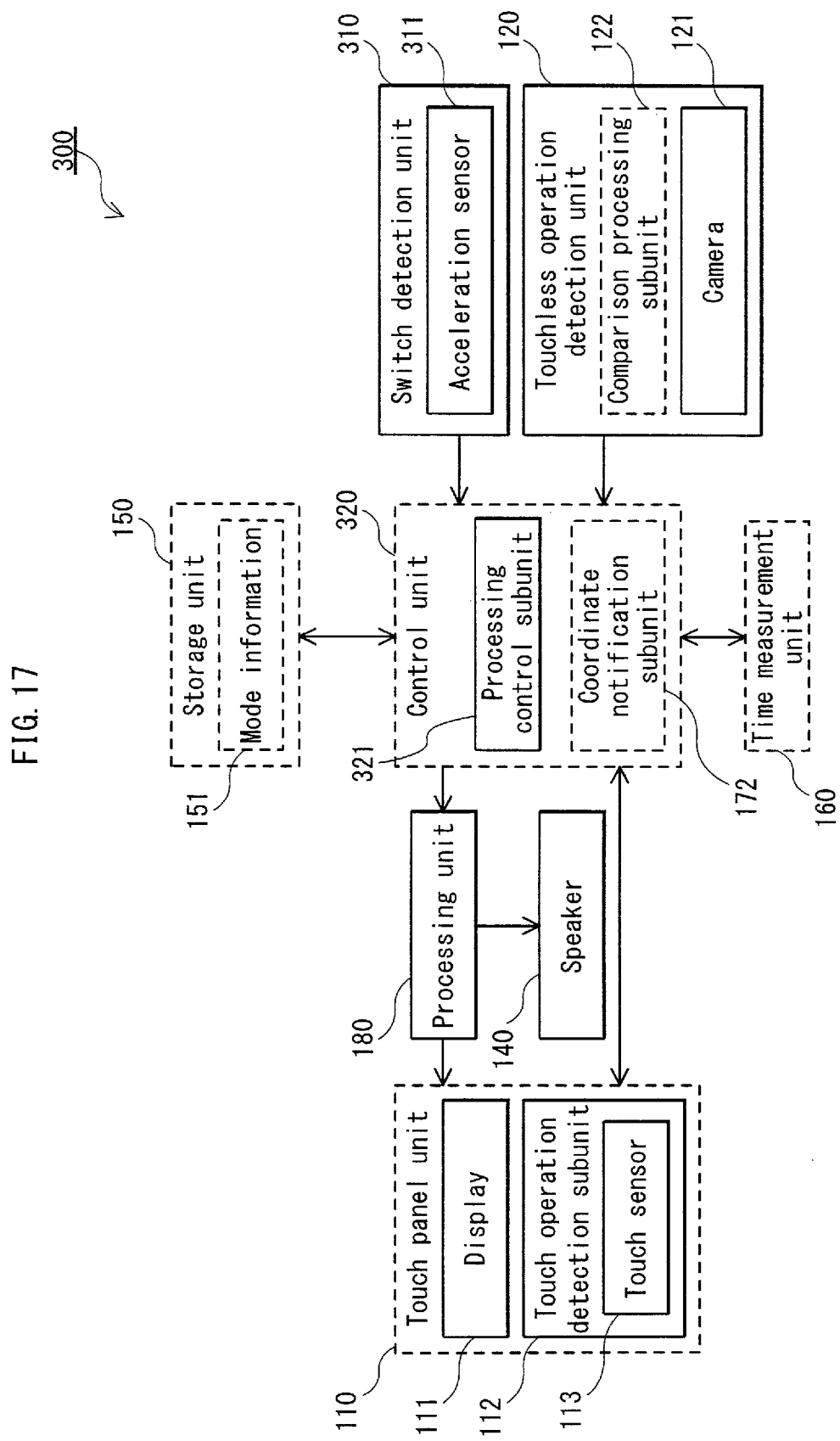
FIG. 17 is a block diagram showing the functional structure of main units of an information processing device 300.

FIG. 17 is a block diagram showing the functional structure of main units of an information processing device 300.

The information processing device 300 includes, as shown in FIG. 17, a touch panel unit 110, a touchless operation detection unit 120, a switch detection unit 310, a speaker 140, a storage unit 150, a time measurement unit 160, a control unit 320, and a processing unit 180.

The information processing device 300 differs from the information processing device 100 relating to the Embodiment 1, in that the information processing device 300 includes the switch detection unit 310 and the control unit 320 instead of the switch detection unit 130 and the control unit 170 included in the information processing device 100, respectively.

Here, the switch detection unit 310 includes an acceleration sensor 311. The switch detection unit 310 transmits a switch signal to the control unit 320 based on variation of acceleration detected by the acceleration sensor 311.

Figure 18:
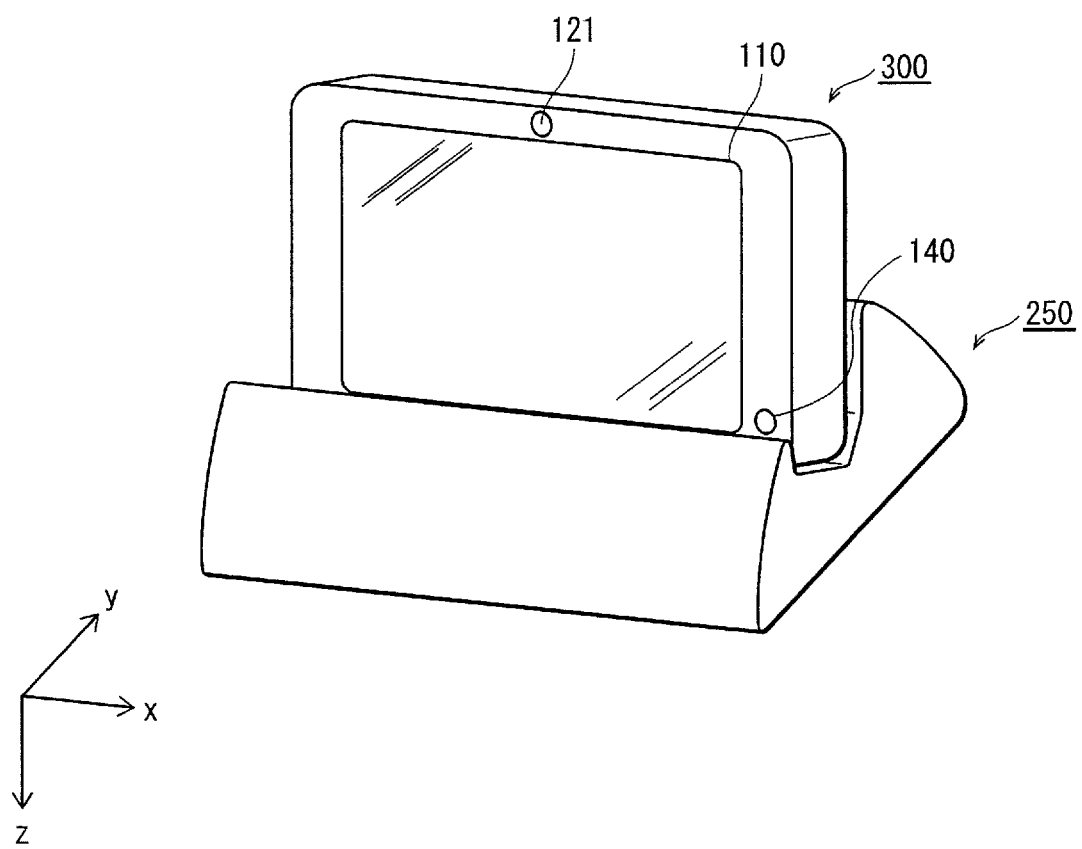
FIG. 18 shows an example where while the information processing device 300 is connected to a cradle 250, acceleration is detected by an acceleration sensor 311.

The acceleration sensor 311 is for example embodied by a 3-axis acceleration sensor. For example, while the information processing device 300 is connected to the cradle 250 as shown in FIG. 18, the acceleration sensor 311 senses acceleration of substantially 0 g in the x-axis direction, acceleration of substantially 0 g in the y-axis direction, and acceleration of substantially 1.0 g in the z-axis direction.

Hereinafter, a status where accelerations in the x-axis direction, the y-axis direction, and the z-axis direction detected by the acceleration sensor 311 are substantially 0 g, substantially 0 g, and substantially 1.0 g, respectively, is referred to as "connection status".

The switch detection unit 310 transmits a switch signal, in the case where the information processing device 300 switches from the connection status to a status where the acceleration of 1.0 g in the z-axis direction detected by the acceleration sensor 311 decreases by a predetermined threshold or greater, or in the case where the information processing device 300 switches from a status, which is not the connection status, to the connection status and then maintains in the connection status for a certain time period (of approximately 10 seconds, for example).

Also, the control unit 320 differs from the control unit 170 included in the information processing device 100 relating to the Embodiment 1, in that the control unit 320 includes a processing control subunit 321 instead of the processing control subunit 171 included in the control unit 170.

The processing control subunit 321 differs from the processing control subunit 171, in that the processing control unit subunit 321 issues an instruction to start processing to the processing unit 180 in accordance with different timing from that of the processing control subunit 171 and issues no instruction to perform undo processing.

In the case where the mode information 151 indicates the first input mode, only when receiving no switch signal from the switch detection unit 310 within a predetermined time period (of approximately some seconds, for example) after reception of the touchless identifier from the touchless operation detection unit 120, the processing control unit 321 issues an instruction to start processing to the processing unit 180.

<Operations>

Figure 19:
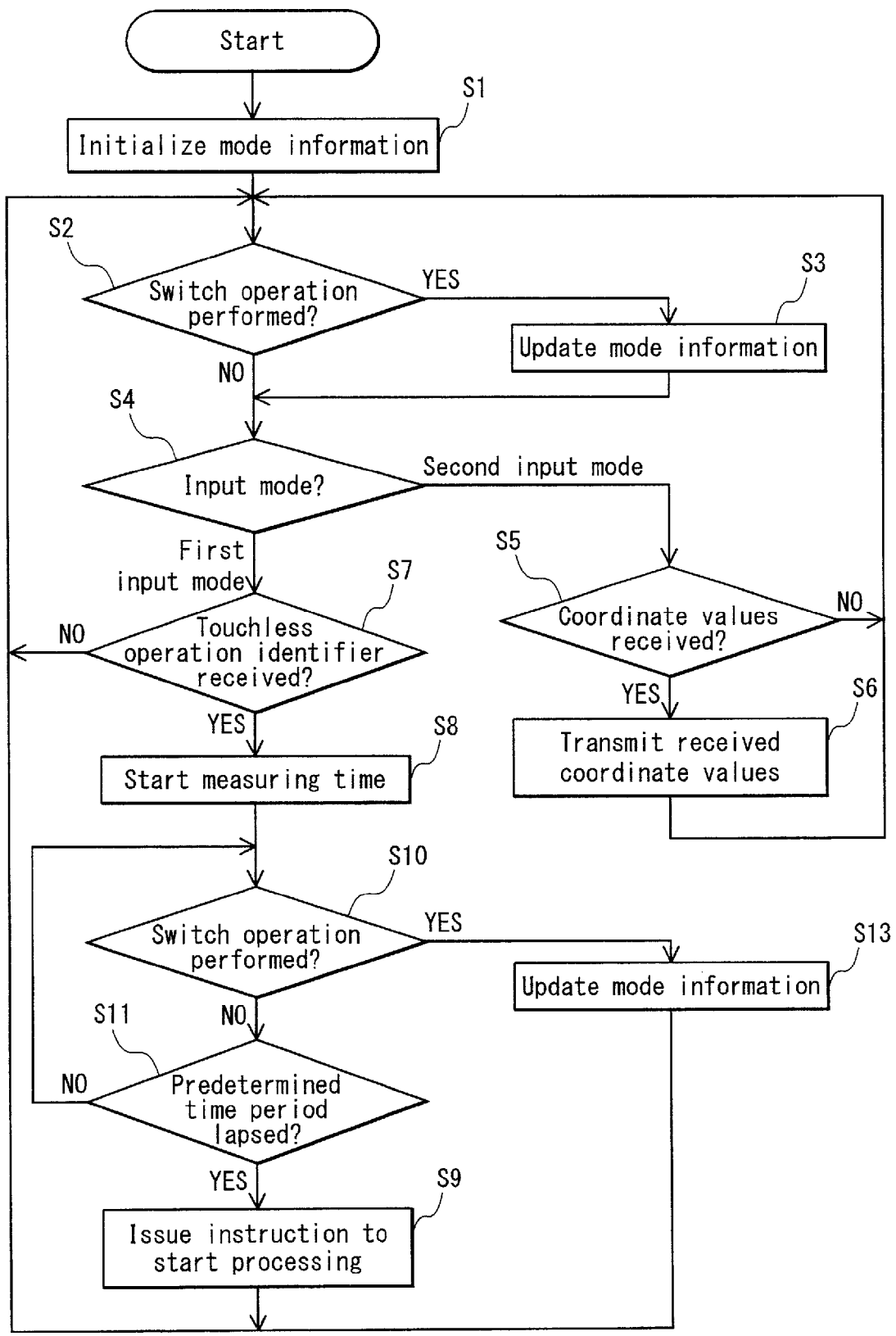
FIG. 19 is a flow chart showing control processing by a control unit 320 of the information processing device 300.

The following describes the operations of the information processing device 300 having the above structure, with reference to FIG. 19.

FIG. 19 is a flow chart showing control processing by the control unit 320 of the information processing device 300.

In the control processing by the information processing device 300, if affirmative judgment is performed in Step S11 (Step S11: YES), the control unit 220 performs the processing of Step S9 included in the control processing shown in FIG. 11 by the information processing device 100 relating to the Embodiment 1. Also, the control processing by the information processing device 300 does not include the processing of Step S12 included in the control processing shown in FIG. 11.

The following describes control processing by the information processing device 300, focusing on the difference the control processing by the information processing device 100.

The information processing device 300 performs the processing of Steps S1 to S8 in the same manner as the information processing device 100. In Step S8, the processing control unit 321 controls the time measuring unit 160 to start measuring a predetermined time period. If no switch operation has been made before the predetermined time period has lapsed (Step S10: NO and Step S11: YES), the processing control unit 321 issues an instruction to start processing (Step S9). Then, the flow returns to the processing of Step S2.

On the contrary, a switch operation is made before the predetermined time period has lapsed (Step S10: YES), the control unit 320 updates the mode information (Step S13), and then the flow returns to the processing of Step S2.

<Supplementary Description>

Although the information processing device relating to the present invention has been described based on the above embodiments and modifications, the following modifications may be employed. The present invention is not of course limited to the information processing device as described in the above embodiments and modifications.

(1) The touchless operation detection unit 120 included in the respective information processing devices relating to the above embodiments and modifications detects a touchless operation based on image data photographed and generated by the camera 121.

Alternatively, the touchless operation detection unit 120 may be modified so as to include a range sensor instead of the camera 121, and detect a touchless operation based on a range image obtained by the range sensor.

The range image represents a value indicating a distance for each pixel from the range sensor to a detection target (the user in this example), based on a time period from when sonic wave or light is output by the range sensor till when the output sonic wave or light returns back to the range sensor after striking the detection target.

Further alternatively, the touchless operation detection unit 120 may be modified so as to include a sensor capable of obtaining a range image such as a plurality of distance sensors.

Also, a touchless operation may be detected in the following manner. For example, the user is caused to wear a data glove on his hand, data indicating a hand sign detected by the data glove is transmitted to the information processing device via wireless or wired communication, and a touchless operation is detected based on the transmitted data.

Furthermore, a touchless operation may be detected in the following manner. For example, the user is caused to put a mark (such as a seal) at a joint of his finger, and a touchless operation is detected based on a position where the mark is put, which appears on image data photographed and generated by the camera 121.

Also, in the above embodiments and modifications and the above supplementary descriptions, a touchless operation to be detected is specified based on a sign made by the user with his hand. Alternatively, a touchless operation to be detected may be specified based on a sign made by the user with part of his body other than his hand. Further alternatively, as a touchless operation, an action made by the user with part of his body may be detected in addition to a sign made by the user with the part of his body. For example, a touchless operation may be detected in the case where the user waves his hand with the Palm sign.

A sign made by the user with part of his body is obtained at regular intervals, and an action made by the user with the part of his body can be detected based on the difference in sign between before and after obtaining.

(2) In the Embodiments 1 and 2 and the Modification 2, display switch processing of the display 111 is performed in accordance with a touchless operation received as an input.

Alternatively, it may be possible, for example, to associate each touchless operation with one or more letters, and display, on a screen being displayed, one or more letters associated with a touchless operation received as an input. In other words, when a touchless operation is received as an input, switch may be performed from a screen on which no letter is displayed to a screen on which one or more letters are displayed.

(3) The information processing devices relating to each of the above embodiments and modifications has been described to include the touch panel unit 110, which is composed of the display 111 and the touch operation detection subunit 112 including the touch sensor 113.

Alternatively, the touch operation detection subunit 112 may function as a so-called touch pad, by providing the touch operation detection subunit 112 separately from the display 111.

Also, the display 111 has been described to include an LCD. Alternatively, the display 111 may include an organic EL (Electro-Luminescence) or the like.

Furthermore, the display 111 has been described to include an LCD that is substantially rectangular. Alternatively, the LCD may be circular or polygonal, for example.

Furthermore, the touch operation detection subunit 112 has been described to include the touch sensor 113. Alternatively, the touch operation detection subunit 112 may for example include sets of hardware buttons instead of the touch sensor 113, as long as a touch operation made on the information processing device can be detected.

(4) The touch sensor 113 relating to each of the above embodiments and modifications has been described to be embodied by a capacitive touch sensor. As the capacitive touch sensor, an appropriate type touch sensor may be employed such as a projected capacitive touch sensor and a surface capacitive touch sensor. The projected capacitive touch sensor is capable of forming a number of electrode patterns on a substrate made of plastic, glass, or the like, and measuring a rate of amount of current by a plurality of electrode patterns adjacent to a touch position to detect the touch position. The surface capacitive touch sensor is formed from a conductive film and a substrate having a corner on which an electrode is provided so as to form a uniform electric field by the conductive film, and is capable of measuring a rate of amount of current resulting from a touch made on the electrode provided on the corner by the user's finger or the like to detect a touch position.

Furthermore, the touch sensor 113 may be embodied by the following sensors, instead of a capacitive touch sensor, including: an electromagnetic induction touch sensor using a dedicated pen such as an electronic pen: a matrix switch touch sensor composed of a double-layered transparent electrode: a resistive touch sensor of applying voltage to one of two resistive films, and detecting voltage in a position where an operation is made on the other resistive film; a surface acoustic wave touch sensor of detecting bounce from a vibration wave using variation of a voltage of piezoelectric elements to detect a touch made by the user's finger or the like; an infrared ray touch sensor of detecting a position where a touch is made by the user's finger or the like using an infrared ray which is shielded; and an optical touch sensor of detecting a touch position using an optical sensor mounted in a screen.

(5) The switch operation for switching the input mode from the first input mode to the second input mode may be realized for example by touch made on the touch panel unit 110, without limiting to the examples described in the above embodiments and modifications.

Alternatively, for improving the user convenience, the respective switch operations described in the above embodiments and modifications may be combined in some way. Specifically, the switch detection unit 130 relating to the Embodiment 1, which includes the switch button 131, is modified so as to include the switch 211 or the acceleration sensor 311. The input mode may be switched when the switch button 211 is pressed or when it is detected that the information processing device is disconnected from the cradle 250.

Also, the above embodiments and modifications have made the descriptions with use of the example where the switch operation for switching the input mode from the first input mode to the second input mode is the same as the operation for switching the input mode from the second input mode to the first input mode. Alternatively, these operations may not be the same.

The shape and location of the switch button 131 shown in FIG. 1 are just an example, and may be appropriately modified.

(6) The Embodiment 2 has described that when the acceleration sensor 311 detects acceleration in the z-axis direction of a value that is smaller than 1.0 g by the predetermined threshold or greater, it is detected that the user has picked up the information processing device 300 that is connected to the cradle 250 (in the connection status), and the switch detection unit 310 transmits a switch signal.

Alternatively, when the acceleration sensor 311 detects variation of acceleration in any of the axis directions by a predetermined extent, the switch detection unit 310 may transmit a switch signal. This makes it possible, without the cradle 250, to detect that the user has picked up the information processing device 300, and switch the input mode from the first input mode to the second input mode.

Further alternatively, in the case where the acceleration sensor 311 detects no variation of acceleration in any of the axis directions for a certain time period (of approximately 10 seconds, for example), the switch detection unit 310 may transmit a switch signal. This makes it possible, when the user places the information processing device on a desk or the like, to switch the input mode from the second input mode to the first input mode.

(7) The above Embodiments 1 and 2 and the Modification 2 have described that, in the first input mode, when a touchless operation is detected, wipe-in display of a screen that corresponds to the detected touchless operation is started, and when a switch operation is made within the predetermined time period after detection of the touchless operation, wipe-out display of the screen is performed.

Alternatively, without performing wipe-in display, a screen to be displayed may be switched from a screen, which has been displayed before the detection of the touchless operation, at once to the screen that corresponds to the detected touchless operation. Further alternatively, without performing wipe-out display, a screen to be displayed may be switched from a screen, which is being displayed, at once to the screen that has been displayed before the start of wipe-in display.

(8) The above embodiments and the modifications have described that a time period to be measured by the time measurement unit 160 is predetermined. Alternatively, the time period to be measured may be set by the user. Further alternatively, the time period to be measured may be set in the following manner. For example, at the start of use of the information processing device, the user is caused to make a switch operation a plural times, and an average time period is calculated based on a time period from detection of a touchless operation with no intention of the user in spite of attempting to make a switch operation.

(9) The information processing device relating to the present invention is not limited to be plate-like such as the information processing device relating to each of the above embodiments and modifications, and may be foldable such as a general laptop.

(10) The Modification 1 has described that, in the first input mode, in the case where a switch operation is made within a predetermined time period after detection of a touchless operation, processing of stopping playback of music is performed as undo processing. Alternatively, as the undo processing, display switch processing of the display 111 may be performed, in addition to the processing of stopping playback of music. In other words, a screen to be displayed on the display 111 may be returned back to a screen that has been displayed before the start of the processing of playing back music (screen shown in FIG. 12A).

(11) Also, each of the structural elements described in the above embodiments and modifications may be partially or entirely realized by an integrated circuit having one chip or multiple chips. Alternatively, each of the structural elements may be realized by computer programs or any other configuration.

Each of the structural elements described in the above embodiments and modifications realizes its functions in cooperation with the processor included in the information processing device.

A method of circuit integration is not limited to an LSI, and may be realized by a dedicated circuit or a general processor. Furthermore, it may be possible to use an FPGA (Field Programmable Gate Array) programmable after manufacturing LSIs or a reconfigurable processor in which connection and setting of a circuit cell inside an LSI is reconfigurable after manufacturing LSIs.

Furthermore, the LSI may be called an IC, a system LSI, a super LSI, and an ultra LSI, depending on the integration degree.

Furthermore, when a new technology for forming integrated circuits that replaces LSIs becomes available as a result of progress in semiconductor technology or semiconductor-derived technologies, functional blocks may be integrated using such technology. One possibility lies in adaptation of biotechnology.

(12) A program, which is for causing the processor to perform control processing (see FIGS. 11, 16, and 19) of the information processing device, may be recorded in a recording medium or distributed via various types of communication channels or the like. The above recording medium includes an IC card, a hard disk, an optical disc, a flexible disk, a ROM, a flash memory, and the like. The distributed program is usable by being stored on, for example, a memory readable by a processor included in a device. The various types of functions of the information processing device described in the above embodiments and modifications are realized by the processor executing the program.

(13) It may be possible to combine partially or entirely the above supplementary descriptions (1) to (12) with one another, and apply the combination to the information processing device relating to each of the above embodiments and modifications.

(14) The following further describes the structure and effects of an information processing device relating to an embodiment of the present invention.

(a) An information processing device relating to one embodiment is an information processing device comprising: a touch operation detection unit operable to detect a touch operation made on a body of the information processing device; a touchless operation detection unit operable to detect a sign made by part of a user's body, as a touchless operation made with no touch on the body of the information processing device; a switch detection unit operable to detect a switch operation for switching an input mode from a first input mode to a second input mode, the switch operation being made with a touch on the body of the information processing device, the first input mode being for receiving, as an input, a touchless operation detected by the touchless operation detection unit, and the second input mode being for receiving, as an input, a touch operation detected by the touch operation detection unit; a processing unit operable to perform processing in accordance with an instruction; and a control unit operable, in the first input mode, to receive, as an input, a touchless operation detected by the touchless operation detection unit, and issue a first instruction to the processing unit to start processing that corresponds to the received touchless operation, and if the switch detection unit detects a switch operation within a predetermined time period after the reception of the touchless operation, to issue a second instruction to the processing unit to set an output status obtained as a result of the processing started by the processing unit in accordance with the first instruction to an output status which has been obtained before the start of the processing.

Assume, for example, that a touchless operation, which is specified by a sign made by the hand of the user who is attempting to make a switch operation, is received as an input with no intention of the user. Even in this case, by the user actually making a switch operation within the predetermined time period after reception of this input, the information processing device can set the output status obtained as a result of starting the processing that corresponds to the touchless operation received as an input to the output status which has been obtained before the start of the processing.

As a result, the user has no need to bother to make any operation for setting the output status to the output status which has been obtained before the start of the processing that corresponds to the detected touchless operation.

(b) Also, the information processing device may further comprise a display, wherein the control unit may issue, as the first instruction, an instruction to start display switch processing of switching a screen to be displayed on the display, and the control unit may issue, as the second instruction, an instruction to perform processing of displaying, on the display, a previous screen that has been displayed on the display immediately before the start of the display switching processing by the processing unit in accordance with the first instruction.

Assume, for example, that a touchless operation, which is specified by a sign made by the hand of the user who is attempting to make a switch operation, is received as an input, and as a result this information processing device has started display switch processing of switching a screen to be displayed on the display with no intention of the user. Even in this case, by the user actually making a switch operation within the predetermined time period after reception of this input, the information processing device can display, on the display, a previous screen that has been displayed on the display immediately before the start of the display switching processing.

As a result, the user has no need to bother to make any operation for returning the screen currently being displayed on the screen back to the previous screen that has been displayed before the start of the display switch processing.

(c) Also, in response to reception of the first instruction, the processing unit may start, as the display switch processing, processing of switching from the previous screen to a subsequent screen, such that part of the subsequent screen increasingly appears on the screen and all of the subsequent screen appears on the screen at an elapse of the predetermined time period after the reception of the touchless operation.

Assume, for example, that a touchless operation, which is specified by a sign made by the hand of the user who is attempting to make a switch operation, is received as an input with no intention of the user. Even in this case, by the user actually making a switch operation within the predetermined time period after reception of this input, the information processing device displays, up to a certain point, on the display, the subsequent screen which is to be entirely displayed at completion of the display switch processing, and then switches a screen to be displayed from the subsequent screen, which has been displayed up to the certain point, to the previous screen that has been displayed on the display immediately before the start of the display switching processing.

As a result, the user can easily recognize, based on transition of a screen being displayed on the display, that even in the case where a touchless operation is detected and this causes the information processing device to switch a screen to be displayed in spite of the user's attempting to make a switch operation, the user has no need to make any operation for returning the screen currently being displayed on the screen back to the previous screen that has been displayed before the detection of the touchless operation.

(d) Also, the processing unit may perform, as the display switch processing, processing of switching from the previous screen to a screen resulting from scaling an object included in the previous screen.

According to this information processing device, by the user making a touchless operation, it is possible to scale an object included in a previous screen thereby to display a screen resulting from scaling the object.

(e) Also, the switch detection unit may include a hardware button, and the switch detection unit may detect the switch operation, based on a press of the hardware button.

According to this information processing device, it is possible to realize detection of a switch operation with a simple method, namely, a press of the hardware button.

(f) Also, the switch detection unit may include an acceleration sensor operable to detect acceleration of the information processing device, and the switch detection unit may detect the switch operation, based on detection by the acceleration sensor that the acceleration has varied by a predetermined extent.

This information processing device detects a switch operation, based on detection by the acceleration sensor that acceleration has varied. Accordingly, in order for the user to make a touch operation on the information processing device while holding the information processing device with his hand(s), only by picking up the information processing device, the user can switch the input mode to the second input mode for receiving a touch operation as an input.

(g) Also, the information processing device may be connectable to a cradle, wherein the switch detection unit may include a sensor operable to detect whether the information processing device is connected to or disconnected from the cradle, and the switch detection unit may detect the switch operation, based on detection by the sensor that the information processing device is disconnected from the cradle.

This information processing device detects a switch operation, based on detection by the sensor that the information processing device is disconnected from the cradle. Accordingly, in order for the user to make a touch operation on the information processing device while holding the information processing device with his hand(s), only by disconnecting the information processing device from the cradle, the user can switch the input mode to the second input mode for receiving a touch operation as an input.

(h) Also, the touch operation detection unit may include a touch sensor overlaid on the display, and the switch detection unit may detect the switch operation, based on a touch operation made on the touch sensor detected by the touch operation detection unit in the input first mode.

This information processing device detects an switch operation, based on detection of a touch operation made on the touch sensor. Accordingly, in order for the user to make a touch operation on the touch sensor overlaid on the display, namely, a touch panel, by making an intuitive operation of touching the touch panel, the user can switch the input mode to the second input mode for receiving a touch operation as an input.

(i) Also, the touchless operation detection unit may include a camera, and the touchless operation detection unit may detect the touchless operation, by performing comparison processing based on images photographed by the camera.

This information processing device can comparatively easily detect a sign made by part of the user's body as a touchless operation, by performing comparison processing based on images photographed by the camera.

(j) Also, the information processing device may further comprise a speaker, wherein the control unit may issue, as the first instruction, an instruction to start outputting audio through the speaker, and may issue, as the second instruction, an instruction to stop outputting the audio through the speaker.

Assume, for example, that this information processing device receives a touchless operation, which is a sign made by the hand of the user who is attempting to make a switch operation, as an input, and as a result the information processing device has started outputting audio through the speaker with no intention of the user. Even in this case, by the user actually making a switch operation within the predetermined time period after reception of this input, the information processing device can stop outputting the audio through the speaker. As a result, the user has no need to bother to make any operation for stopping output of the audio.

(k) An information processing device relating to one embodiment is an information processing device comprising: a touch operation detection unit operable to detect a touch operation made on a body of the information processing device; a touchless operation detection unit operable to detect a sign made by part of a user's body, as a touchless operation made with no touch on the body of the information processing device; a switch detection unit operable to detect a switch operation for switching an input mode from a first input mode to a second input mode, the switch operation being made with a touch on the body of the information processing device, the first input mode being for receiving, as an input, a touchless operation detected by the touchless operation detection unit, and the second input mode being for receiving, as an input, a touch operation detected by the touch operation detection unit; a processing unit operable to perform processing in accordance with an instruction; and a control unit operable, in the first input mode, to receive, as an input, a touchless operation detected by the touchless operation detection unit, if the switch detection unit does not detect a switch operation within a predetermined time period after the reception of the touchless operation, to issue an instruction to the processing unit to start processing that corresponds to the received touchless operation, and if the switch detection unit detects a switch operation within the predetermined time period after the reception of the touchless operation, not to issue the instruction to the processing unit to start the processing that corresponds to the received touchless operation.

Assume, for example, that a touchless operation, which is specified by a sign made by the hand of the user who is attempting to make a switch operation, is received as an input with no intention of the user. Even in this case, by the user actually making a switch operation within the predetermined time period after reception of this input, the information processing device can prevent start of processing that corresponds to the touchless operation received as an input.

As a result, the user has no need to make any operation for cancelling the processing that corresponds to the touchless operation received as an input by the information processing device. Furthermore, the information processing device can conceal from the user that the touchless operation has been detected with no intention of the user.

(15) The processing control method relating to the present invention is realized by the information processing device described in each of the above embodiments and modifications (especially see the flows of the control processing shown in FIGS. 11, 16, and 19 for example).

INDUSTRIAL APPLICABILITY

The information processing device relating to the present invention is used for a user to make an operation on the information processing device while switching between a touchless operation and a touch operation.

REFERENCE SIGNS LIST 100, 200, and 300: information processing device
110: touch panel unit
111: display
112: touch operation detection subunit
113: touch sensor
120: touchless operation detection unit
121: camera
122: comparison processing subunit
130, 210, and 310: switch detection unit
131: switch button
140: speaker
150: storage unit
160: time measurement unit
170, 220, and 320: control unit
171 and 321: processing control subunit
172: coordinate notification subunit
180: processing unit
211: switch
250: cradle
311: acceleration sensor

The invention claimed is:
1. An information processing device comprising:
a touch operation detection unit operable to detect a touch operation made on a body of the information processing device;
a touchless operation detection unit operable to detect a sign made by part of a user's body, as a touchless operation made with no touch on the body of the information processing device;
a switch detection unit operable to detect a switch operation for switching an input mode from a first input mode to a second input mode, the switch operation being made with a touch on the body of the information processing device, the first input mode being for receiving, as an input, a touchless operation detected by the touchless operation detection unit, and the second input mode being for receiving, as an input, a touch operation detected by the touch operation detection unit;
a processing unit operable to perform processing in accordance with an instruction; and
a control unit operable, in the first input mode,
to receive, as an input, a touchless operation detected by the touchless operation detection unit, and issue a first instruction to the processing unit to start processing that corresponds to the received touchless operation, and
when an output status is obtained as a result of the processing started by the processing unit in accordance with the first instruction,
if the switch detection unit detects a switch operation within a predetermined time period after the reception of the touchless operation, to issue a second instruction to the processing unit to set the output status to an output status which has been obtained immediately before the start of the processing.

2. The information processing device of claim 1, further comprising
a display, wherein
the control unit issues, as the first instruction, an instruction to start display switch processing of switching a screen to be displayed on the display, and
the control unit issues, as the second instruction, an instruction to perform processing of displaying, on the display, a previous screen that has been displayed on the display immediately before the start of the display switching processing by the processing unit in accordance with the first instruction.

3. The information processing device of claim 2, wherein
in response to reception of the first instruction, the processing unit starts, as the display switch processing, processing of switching from the previous screen to a subsequent screen, such that part of the subsequent screen increasingly appears on the screen and all of the subsequent screen appears on the screen at an elapse of the predetermined time period after the reception of the touchless operation.

4. The information processing device of claim 2, wherein
the processing unit performs, as the display switch processing, processing of switching from the previous screen to a screen resulting from scaling an object included in the previous screen.

5. The information processing device of claim 2, wherein
the switch detection unit includes a hardware button, and
the switch detection unit detects the switch operation, based on a press of the hardware button.

6. The information processing device of claim 2, wherein
the switch detection unit includes an acceleration sensor operable to detect acceleration of the information processing device, and
the switch detection unit detects the switch operation, based on detection by the acceleration sensor that the acceleration has varied by a predetermined extent.

7. The information processing device of claim 2, wherein
the touch operation detection unit includes a touch sensor overlaid on the display, and
the switch detection unit detects the switch operation, based on a touch operation made on the touch sensor detected by the touch operation detection unit in the input first mode.

8. The information processing device of claim 1, wherein
the touchless operation detection unit includes a camera, and
the touchless operation detection unit detects the touchless operation, by performing comparison processing based on images photographed by the camera.

9. The information processing device of claim 1, further comprising a speaker, wherein
the control unit issues, as the first instruction, an instruction to start outputting audio through the speaker, and issues, as the second instruction, an instruction to stop outputting the audio through the speaker.

10. An information processing device comprising:
a touch operation detection unit operable to detect a touch operation made on a body of the information processing device;
a touchless operation detection unit operable to detect a sign made by part of a user's body, as a touchless operation made with no touch on the body of the information processing device;
a switch detection unit operable to detect a switch operation for switching an input mode from a first input mode to a second input mode, the switch operation being made with a touch on the body of the information processing device, the first input mode being for receiving, as an input, a touchless operation detected by the touchless operation detection unit, and the second input mode being for receiving, as an input, a touch operation detected by the touch operation detection unit;
a processing unit operable to perform processing in accordance with an instruction;
a control unit operable, in the first input mode,
to receive, as an input, a touchless operation detected by the touchless operation detection unit, and issue a first instruction to the processing unit to start processing that corresponds to the received touchless operation, and
if the switch detection unit detects a switch operation within a predetermined time period after the reception of the touchless operation, to issue a second instruction to the processing unit to set an output status obtained as a result of the processing started by the processing unit in accordance with the first instruction to an output status which has been obtained before the start of the processing; and
a display, wherein
the control unit issues, as the first instruction, an instruction to start display switch processing of switching a screen to be displayed on the display,
the control unit issues, as the second instruction, an instruction to perform processing of displaying, on the display, a previous screen that has been displayed on the display immediately before the start of the display switching processing by the processing unit in accordance with the first instruction,
the information processing device is connectable to a cradle, the switch detection unit includes a sensor operable to detect whether the information processing device is connected to or disconnected from the cradle, and
the switch detection unit detects the switch operation, based on detection by the sensor that the information processing device is disconnected from the cradle.

11. An information processing device comprising:
a touch operation detection unit operable to detect a touch operation made on a body of the information processing device;
a touchless operation detection unit operable to detect a sign made by part of a user's body, as a touchless operation made with no touch on the body of the information processing device;
a switch detection unit operable to detect a switch operation for switching an input mode from a first input mode to a second input mode, the switch operation being made with a touch on the body of the information processing device, the first input mode being for receiving, as an input, a touchless operation detected by the touchless operation detection unit, and the second input mode being for receiving, as an input, a touch operation detected by the touch operation detection unit;
a processing unit operable to perform processing in accordance with an instruction; and
a control unit operable, in the first input mode,
to receive, as an input, a touchless operation detected by the touchless operation detection unit,
if the switch detection unit does not detect a switch operation within a predetermined time period after the reception of the touchless operation, to issue an instruction to the processing unit to start processing that corresponds to the received touchless operation, and
if the switch detection unit detects a switch operation within the predetermined time period after the reception of the touchless operation, not to issue the instruction to the processing unit to start the processing that corresponds to the received touchless operation, wherein
the information processing device is connectable to a cradle, the switch detection unit includes a sensor operable to detect whether the information processing device is connected to or disconnected from the cradle, and
the switch detection unit detects the switch operation, based on detection by the sensor that the information processing device is disconnected from the cradle.

12. A processing control method for use in an information processing device that performs processing that corresponds to an input, the processing control method comprising:
a touch operation detection step of detecting a touch operation made on a body of the information processing device;
a touchless operation detection step of detecting a sign made by part of a user's body, as a touchless operation made with no touch on the body of the information processing device;
a switch detection step of detecting a switch operation for switching an input mode from a first input mode to a second input mode, the switch operation being made with a touch on the body of the information processing device, the first input mode being for receiving, as an input, a touchless operation detected in the touchless operation detection step, and the second input mode being for receiving, as an input, a touch operation detected in the touch operation detection step;
a first control step of, in the first input mode, receiving, as an input, a touchless operation detected in the touchless operation detection step, and starting processing that corresponds to the received touchless operation; and
a second control step of, when an output status is obtained as a result of the processing started in the first control step, if the switch detection step detects a switch operation within a predetermined time period after the reception of the touchless operation, setting the output status to an output status which has been obtained immediately before the start of the processing.

13. A non-transitory computer-readable recording medium having recorded therein a program for causing a computer included in an information processing device to perform control processing, the information processing device performing processing that corresponds to an input, the control processing comprising:
- a touch operation detection step of detecting a touch operation made on a body of the information processing device;
- a touchless operation detection step of detecting a sign made by part of a user's body, as a touchless operation made with no touch on the body of the information processing device;
- a switch detection step of detecting a switch operation for switching an input mode from a first input mode to a second input mode, the switch operation being made with a touch on the body of the information processing device, the first input mode being for receiving, as an input, a touchless operation detected in the touchless operation detection step, and the second input mode being for receiving, as an input, a touch operation detected in the touch operation detection step;
- a first control step of, in the first input mode, receiving, as an input, a touchless operation detected in the touchless operation detection step, and starting processing that corresponds to the received touchless operation; and
- a second control step of, when an output status is obtained as a result of the processing started in the first control step, if the switch detection step detects a switch operation within a predetermined time period after the reception of the touchless operation, setting the output status to an output status which has been obtained immediately before the start of the processing.

* * * * *